(12) United States Patent
Golitschek Edler Von Elbwart et al.

(10) Patent No.: US 9,723,626 B2
(45) Date of Patent: Aug. 1, 2017

(54) DYNAMIC TDD UPLINK/DOWNLINK CONFIGURATION USING DCI

(71) Applicant: Sun Patent Trust, New York, NY (US)

(72) Inventors: Alexander Golitschek Edler Von Elbwart, Langen (DE); Joachim Loehr, Langen (DE); Michael Einhaus, Langen (DE); Sujuan Feng, Langen (DE); Lilei Wang, Beijing (CN); Toru Oizumi, Osaka (JP)

(73) Assignee: Sun Patent Trust, New York, NY (US)

( * ) Notice: Subject to any disclaimer, the term of this patent is extended or adjusted under 35 U.S.C. 154(b) by 104 days.

(21) Appl. No.: 14/760,992

(22) PCT Filed: Jan. 17, 2013

(86) PCT No.: PCT/CN2013/070620
§ 371 (c)(1),
(2) Date: Jul. 14, 2015

(87) PCT Pub. No.: WO2014/110764
PCT Pub. Date: Jul. 24, 2014

(65) Prior Publication Data
US 2015/0358998 A1    Dec. 10, 2015

(51) Int. Cl.
*H04W 72/12* (2009.01)
*H04W 74/08* (2009.01)
*H04W 52/36* (2009.01)
*H04W 72/04* (2009.01)
*H04L 5/14* (2006.01)
(Continued)

(52) U.S. Cl.
CPC ....... *H04W 72/1289* (2013.01); *H04L 1/0041* (2013.01); *H04L 1/0061* (2013.01);
(Continued)

(58) Field of Classification Search
None
See application file for complete search history.

(56) References Cited

U.S. PATENT DOCUMENTS

| 8,351,974 B2 | 1/2013 | Ahn et al. |
| 2009/0197630 A1 | 8/2009 | Ahn et al. |

(Continued)

FOREIGN PATENT DOCUMENTS

| CN | 101203020 A | 6/2008 |
| CN | 101547498 A | 9/2009 |

(Continued)

OTHER PUBLICATIONS

International Search Report dated Oct. 24, 2013, for corresponding International Application No. PCT/CN2013/070620, 2 pages.
(Continued)

*Primary Examiner* — Christopher Crutchfield
(74) *Attorney, Agent, or Firm* — Seed IP Law Group LLP

(57) ABSTRACT

The invention relates to a method for dynamically indicating a TDD re-configuration to the mobile station by encoding the dynamic TDD re-configuration indication into the DCI or CRC calculated for the DCI. In one embodiment, the TDD configuration indication is implicitly encoded as an RNTI into the CRC, when scrambling the CRC for the DCI with a TDD-RNTI. In another embodiment, the TDD configuration indication is part of the DCI payload, while the CRC for the DCI is scrambled with a cell identifier, identifying the target cell for which the dynamic TDD re-configuration is to be applied. In still another embodiment, the TDD configuration indication is part of the DCI payload, where the DCI payload further includes an invalid parameter indicating to the mobile station that the DCI carries the TDD configuration indication.

12 Claims, 10 Drawing Sheets

(51) Int. Cl.
*H04L 1/18* (2006.01)
*H04L 1/00* (2006.01)
*H04W 48/16* (2009.01)

(52) U.S. Cl.
CPC .......... *H04L 1/1812* (2013.01); *H04L 1/1887* (2013.01); *H04L 5/14* (2013.01); *H04L 5/1438* (2013.01); *H04L 5/1469* (2013.01); *H04W 48/16* (2013.01); *H04W 52/365* (2013.01); *H04W 72/0446* (2013.01); *H04W 74/0833* (2013.01); *H04L 1/008* (2013.01); *H04W 72/042* (2013.01)

(56) References Cited

U.S. PATENT DOCUMENTS

2012/0281600 A1* 11/2012 Tseng .................. H04W 76/048
370/280

2013/0039231 A1* 2/2013 Wang .................... H04W 72/10
370/280
2013/0194980 A1* 8/2013 Yin ....................... H04L 1/1854
370/280

FOREIGN PATENT DOCUMENTS

| | | | |
|---|---|---|---|
| CN | 101884179 A | 11/2010 | |
| KR | WO 2012177037 A2 * | 12/2012 | ........... H04B 7/2656 |
| WO | 2012/153960 A2 | 11/2012 | |
| WO | WO 2012153960 A2 * | 11/2012 | ........ H04W 56/0045 |
| WO | 2012/177037 A2 | 12/2012 | |

OTHER PUBLICATIONS

English Translation of Notice of Reasons for Rejection, dated Jul. 5, 2016, for corresponding JP Application No. 2015-552963, 7 pages.

* cited by examiner

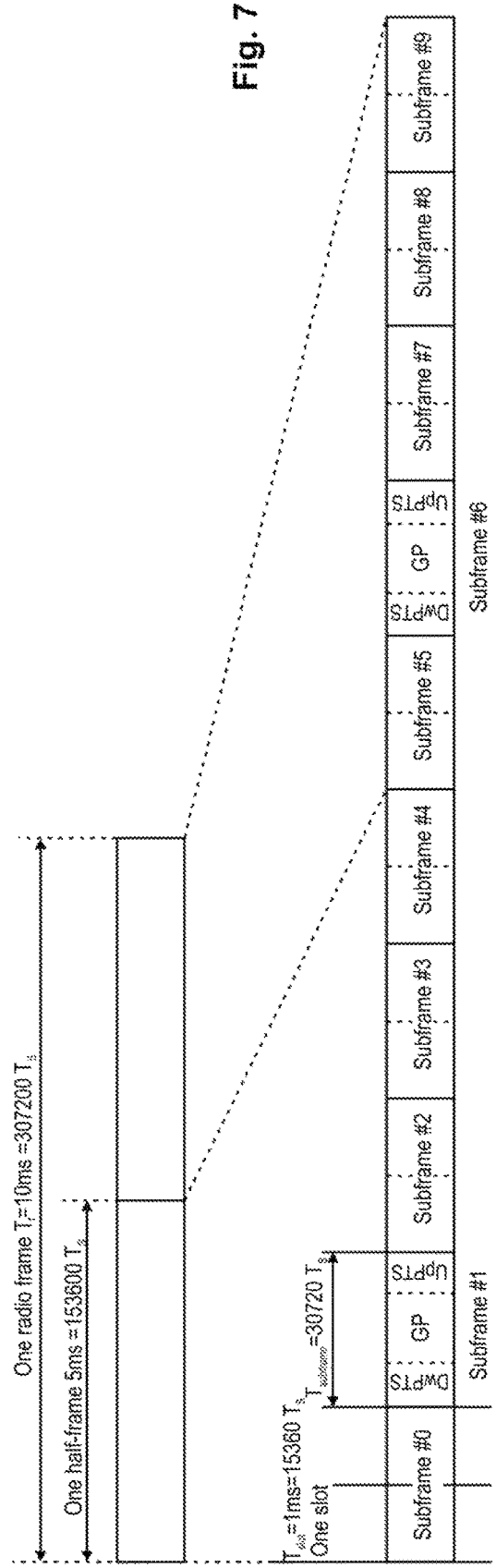

| Uplink-downlink configuration | Downlink-to-Uplink Switch-point periodicity | Subframe number | | | | | | | | | | associated RNTI for scrambling of CRC |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | TDD_0_RNTI |
| 1 | 5 ms | D | S | U | U | D | D | S | U | U | D | TDD_1_RNTI |
| 2 | 5 ms | D | S | U | D | D | D | S | U | D | D | TDD_2_RNTI |
| 3 | 10 ms | D | S | U | U | U | D | D | D | D | D | TDD_3_RNTI |
| 4 | 10 ms | D | S | U | U | D | D | D | D | D | D | TDD_4_RNTI |
| 5 | 10 ms | D | S | U | D | D | D | D | D | D | D | TDD_5_RNTI |
| 6 | 5 ms | D | S | U | U | U | D | S | U | U | D | TDD_6_RNTI |

| Uplink-downlink configuration | Downlink-to-Uplink Switch-point periodicity | Subframe number | | | | | | | | | | TDD configuration indication |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | 000 |
| 1 | 5 ms | D | S | U | U | D | D | S | U | U | D | 001 |
| 2 | 5 ms | D | S | U | D | D | D | S | U | D | D | 010 |
| 3 | 10 ms | D | S | U | U | U | D | D | D | D | D | 011 |
| 4 | 10 ms | D | S | U | U | D | D | D | D | D | D | 100 |
| 5 | 10 ms | D | S | U | D | D | D | D | D | D | D | 101 |
| 6 | 5 ms | D | S | U | U | U | D | S | U | U | D | 110 |

DYNAMIC TDD UPLINK/DOWNLINK CONFIGURATION USING DCI

BACKGROUND

Technical Field

The invention relates to methods for indicating a Time Division Duplex uplink/downlink configuration for a mobile station. The invention is also providing the mobile station and the base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8 and further) is subdivided in the time-frequency domain in so-called subframes. In 3GPP LTE (Release 8 and further) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols) and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e. resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g. an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference). For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access.

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation.

This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation.

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank.

Format 2B: Introduced in Release 9 and is used for the transmission of resource assignments for PDSCH for dual-layer beamforming.

Format 2C: Introduced in Release 10 and is used for the transmission of resource assignments for PDSCH for closed-loop single-user or multi-user MIMO operation with up to 8 layers.

Format 2D: introduced in Release 11 and is used for up to 8 layer transmissions; mainly used for COMP (Cooperative Multipoint)

Format 3 and 3A: DCI formats 3 and 3A are used for the transmission of power control commands for PUCCh and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The following table gives an overview of some available DCI formats and the typical number of bits, assuming for illustration purposes a system bandwidth of 50 RBs and four antennas at the eNodeB. The number of bits indicated in the right column include the bits for the CRC of the particular DCI.

| DCI format | Purpose | Number of bits including CRC |
| --- | --- | --- |
| 0 | PUSCH grants | 43 |
| 1 | PDSCH assignments with a single codeword | 47 |
| 1A | PDSCH assignments using a compact format | 43 |
| 1B | PDSCH assignments for rank-1 transmission | 46 |
| 1C | PDSCH assignments using a very compact format | 29 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 2B | PDSCH assignments for dual-layer beamforming | 57 |
| 2C | PDSCH assignments for closed-loop single-user or multiuser MIMO operation | 58 |
| 2D | PDSCH assignments for closed-loop single-user or multi-user MIMO operation, COMP | 61 |
| 3 | Transmit Power Control (TPC) commands for multiple users for PUCCH and PUSCH with 2-bit power adjustments | 43 |
| 3A | Transmit Power Control (TPC) commands for multiple users for PUCCH and PUSCH with 1-bit power adjustments | 43 |
| 4 | PUSCH grants | 52 |

FIG. 5 illustrates the processing structure for one DCI, according to 3GPP TS 36.212 Figure 5.3.3.1, as follows:
Information element multiplexing (refers to the multiplexing of the particular information elements making up the one DCI)
CRC attachment
Channel coding
Rate matching In order that the UE can identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below.

The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding e.g. a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

There are various types of RNTIs that are used for different purposes. The following tables taken from 3GPP 36.321 Chapter 7.1 shall give an overview of the various 16-bits RNTIs and their usages.

| Value (hexa-decimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

| Usage | Transport Channel | Logical Channel |
|---|---|---|
| Paging and System Information change notification | PCH | PCCH |
| Broadcast of System Information | DL-SCH | BCCH |
| MCCH Information change notification | N/A | N/A |
| Random Access Response | DL-SCH | N/A |
| Contention Resolution (when no valid C-RNTI is available) | DL-SCH | CCCH |
| Msg3 transmission | UL-SCH | CCCH, DCCH, DTCH |
| Dynamically scheduled unicast transmission | UL-SCH | DCCH, DTCH |
| Dynamically scheduled unicast transmission | DL-SCH | CCCH, DCCH, DTCH |
| Triggering of PDCCH ordered random access | N/A | N/A |
| Semi-Persistently scheduled unicast transmission (activation, reactivation and retransmission) | DL-SCH, UL-SCH | DCCH, DTCH |
| Semi-Persistently scheduled unicast transmission (deactivation) | N/A | N/A |
| Physical layer Uplink power control | N/A | N/A |
| Physical layer Uplink power control | N/A | N/A |

Physical Downlink Control Channel (PDCCH) and Physical Downlink Shared Channel (PDSCH)

The physical downlink control channel (PDCCH) carries e.g. scheduling grants for allocating resources for downlink or uplink data transmission.

Each PDCCH is transmitted using one or more so called Control Channel Elements (CCEs). Each CCE corresponds to a set of Resource Elements (REs). In 3GPP LTE, at the moment one CCE consists of 9 Resource Element Groups (REGs), where one REG consists of four consecutive REs (consecutive in the frequency domain) excluding potential REs of reference signals. The resource elements occupied by reference symbols are not included within the REGs, which means that the total number of REGs in a given OFDM symbol depends on whether or not reference signals are present.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

In 3GPP LTE a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a subframe.

On a transport channel level, the information transmitted via the PDCCH is also referred to as L1/L2 control signaling. L1/L2 control signaling is transmitted in the downlink for each user equipment (UE). The control signaling is commonly multiplexed with the downlink (user) data in a subframe (assuming that the user allocation can change from subframe to subframe).

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes which contain a guard period to allow for switching between the downlink and uplink transmission. The guard period allows the uplink transmission timing to be advanced. This TDD structure is known as "Frame Structure Type 2" in 3GPP LTE Release 8 and later, of which seven different configurations are defined, which allow a variety of downlink-uplink ratios and switching periodicities. FIG. 6 illustrates the Table with the 7 different TDD uplink downlink configurations, indexed from 0-6. As can be seen therefrom, the seven available TDD uplink-downlink configurations can provide between 40% and 90% of downlink subframes (when counting a special subframe as a downlink subframe, since part of such a subframe is available for downlink transmission).

FIG. 7 shows the frame structure type 2, particularly for a 5 ms switch-point periodicity, i.e. for TDD configurations 0, 1, 2 and 6.

FIG. 7 illustrates a radio frame, being 10 ms in length, and the corresponding two half-frames of 5 ms each. The radio frame consists of 10 subframes with 1 ms, where each of the subframes is assigned the type of uplink, downlink or special, as defined by the table of FIG. 6, where "D" means Downlink, "U" means Uplink and "S" means Special.

As can be appreciated from FIG. 6, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and of UpPTS (Uplink Pilot Time Slot). The following Table shows information on the special subframe and in particular lists the lengths of DwPTS (Downlink Pilot Time Slot), the GP (Guard Period) and of UpPTS (Uplink Pilot Time Slot) as a multiple of the sample time $T_s=(1/30720)$ ms as defined for 3GPP LTE Release 11.

nism for adapting UL-DL allocation is based on the system information acquisition procedure or the system information change procedure, where the TDD UL-DL configuration is indicated by a SIB, particularly the TDD-config parameter in SIB1. (for details on the broadcast of system information, 3GPP TS 25.331, "Radio Resource Control (RRC)", version 6.7.0, section 8.1.1, incorporated herein by reference; available at http://www.3gpp.org).

With the Release 8 system information change procedure, the supported time scale for a TDD UL/DL re-configuration is every 640 ms or larger. When re-using the ETWS (Earthquake and Tsunami Warning System), the supported time scale for TDD UL-DL re-configuration is every 320 ms or larger depending on the configured default paging cycle.

The semi-static allocation of the TDD UL/DL configuration may or may not match the instantaneous traffic situation. However, it would be advantageous to adapt the TDD UL/DL configuration to the current traffic needs; for instance, in order to dynamically create more blank uplink subframes to mitigate interference to the communication e.g. in uplink or downlink of a neighboring cell. Correspondingly, it is expected that Release 12 will adopt a more dynamic change of the TDD UL/DL configuration.

3GPP launched a study item TR 36.828 v11.0.0 to study the time scales of various types of TDD UL/DL re-configurations and their benefits and disadvantages. In general, the study item concluded that faster TDD UL/DL re-configuration time scales provide larger benefits than slower TDD UL/DL re-configuration time scales. Further, the amount of required specification changes varies depending on the supported re-configuration time scales.

| | Normal cyclic prefix in downlink | | | Extended cyclic prefix in downlink | | |
| | | UpPTS | | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e. which subframe to monitor for measurement, for CSI measure and report, for time domain filtering to get channel estimation, for PDCCH detection, or for UL/DL ACK/NACK feedback.
Shortcoming of Current Semi-Static TDD UL/DL Configuration Scheme Currently, LTE TDD allows for asymmetric UL-DL allocations by providing seven different semi-statically configured uplink-downlink configurations. The current mecha- The study item however also identified problems for legacy UEs (UEs conformant to only earlier than Release 12 standards that do not implement the dynamic TDD re-configuration mechanism) stemming from different TDD configurations for different UEs. In particular, it is assumed that when the base station wants to dynamically reconfigure the TDD configuration for UEs in a cell, the dynamic TDD re-configuration could only be processed properly by the new UEs; in case the existing SIB-based TDD configuration indication method is not used but a more dynamic indication method, the legacy UEs would not apply the TDD re-configuration. Therefore, the legacy UEs will still assume the presence of reference signals e.g. CRS (Common Reference Symbol) in downlink subframes of the radio frame according to the default (i.e. the SIB-indicated) TDD configuration. In case the dynamic TDD configuration has an uplink subframe instead of a downlink subframe, the legacy UE would thus wrongly assume the CRS to be present, which may lead to wrong measurement and channel estimations.

The study item also considered RRC, MAC and PHY signaling as more dynamic indication methods. TDD UL/DL re-configuration by RRC signaling is in the order of 200 ms and requires a re-configuration message per RRC-connected user, unless a broadcast or a multicast approach is specified. TDD UL/DL re-configuration by MAC Control Element (CE) signaling in the MAC header is the order of a few tens of ms. Using the Physical layer design, such as provided by the L1/L2 control signaling of DCI, a time scale of TDD UL/DL adaptation in the order of 10 ms can be achieved.

In view of the results of the above study item, a TDD UL/DL re-configuration should be performed as fast as possible, thus allowing for a flexible adaptation of the TDD UL/DL configuration to the traffic situations.

BRIEF SUMMARY OF THE INVENTION

One object of the invention is to provide an improved Time Division Duplex configuration indication, that solves the problems of the prior art as discussed above. A dynamic adaptation of the TDD configuration of one or more radio frames should be preferably possible.

The object is solved by the subject matter of the independent claims. Advantageous embodiments are subject to the dependent claims.

According to various embodiments of the invention, the Time Division Duplex (TDD) configuration to be used for communication between the mobile station and the base station is encoded by the base station into a DCI transmission to the mobile station. In this context, the term DCI transmission is to be understood as the whole transmission, which in this particular case means the DCI and the corresponding error detection code (such as CRC). The invention provides various embodiments on how this can be achieved.

According to a first aspect of the invention, the TDD configuration is encoded into the error detection code calculated for the DCI; more particularly, the specific TDD configuration is implicitly encoded into the error detection code. For each of the assignable TDD configurations a different identifier value is defined, and both the mobile stations and the base stations know the pre-defined identifier values and the associations with the possible TDD configurations. In more detail, in LTE communication systems the identifier can be a radio network temporary identifier having a length of 16 bit, which is then scrambled with the 16-bit error detection code (CRC).

Correspondingly, when the base station wants to dynamically change the default TDD configuration to a different target TDD configuration for a particular cell, it will generate a DCI, will calculate a corresponding error detection code for the DCI, and then scramble the calculated CRC with that identifier which is associated with the target TDD configuration the mobile station(s) in that cell shall use for the next radio frame(s).

The DCI itself (i.e. not the CRC) may be either according to a DCI format already defined in the LTE standards or equivalently having the same size as an already defined DCI format, such as of Format 1C, or may be according to a "new" DCI format, which serves the purpose of being used in connection with the dynamic TDD re-configuration.

In case an already defined LTE DCI is used (such as of format 1C), then the base station can set one or more of the parameters in the DCI (in case of Format 1C, the resource block assignment for example) to an invalid value, such that the mobile station processing the DCI and the invalid parameter, may easily determine that the received DCI is not a "conventional" DCI Format 1C assigning downlink resources, but rather is used to convey the TDD configuration for dynamic TDD re-configuration.

The first aspect may be further improved in that the above-mentioned invalid parameter of a defined DCI Format (e.g. DCI format 1C) can be used to encode a further parameter as will be explained. It is assumed that the invalid parameter can not only take one invalid value but various invalid values. In said case, the invalid parameter may be used to encode the indication that the DCI (with said invalid parameter) is carrying the dynamic TDD re-configuration, as well as to encode a further parameter (value). Specifically, the fact that the parameter is set to any or a group of the invalid values allows the mobile station to determine the DCI to be a DCI carrying the TDD configuration indication, and not the conventional DCI. Then, each (or a group) of the invalid values of said parameter may be then associated with a different value of another particular parameter. For example, the actually-available invalid values may be associated with the different TDD configurations, such that the invalid parameter, and particularly one of the invalid value of the parameter, also indicates the desired TDD configuration index for the dynamic TDD UL/DL reconfiguration.

Furthermore, a DCI Format already defined by 3GPP can be re-used, namely by taking the same bit size as the already defined DCI, but defining a different content (information elements) within the DCI for particular situations. For example, the DCI Format 1C of the 3GGP standard TS 36.212 can be extended, such that for one set of cases the DCI Format 1C is used as already defined by 3GPP (for PDSCH assignments), but for the remaining (other) cases the DCI Format 1C is not as intended by 3GPP so far (as defined at the time of filing the application, respectively), but for the purpose of the dynamic TDD re-configuration according to the invention.

As the third alternative, a new DCI Format can be defined, possibly with a different length compared to existing DCI formats; the length depends on the further content (parameters) that is to be included in said new DCI format. As will be explained in further detail below, in any case ("defined", "defined-extended" and "new" DCI) the DCI may include at least one additional parameter that can be used advantageously together with the dynamic TDD re-configuration.

In accordance with the above, the mobile station receiving the DCI and the corresponding error detection code will try descrambling and performing the error detection check on the error detection code using the various identifiers pre-defined for the various TDD configurations. When the mobile station successfully performs the error detection check with one of the various candidate identifiers, the mobile station will then determine the specific TDD configuration associated with the one identifier for which the error detection check was successful. The mobile station then knows the TDD configuration which is to be applied for the next radio frame(s) in its cell.

Furthermore, the mobile station may determine the above-mentioned additional parameter(s) to gain further advantages; details are presented in the detailed description chapter.

According to a second aspect of the invention, instead of implicitly encoding the TDD configuration into the error detection code as in the first aspect, the TDD configuration is directly encoded as a parameter in the DCI. Correspondingly, the DCI generated by the base station comprises a field (preferably up to 3 bit long) indicating the TDD configuration which shall be applied instead of the default TDD configuration. The second aspect of the invention further specifies that the error detection code, calculated for the DCI and transmitted together with the DCI from the base station to the mobile station, is scrambled with a cell identifier, which allows the mobile station to identify the target cell for which the TDD configuration shall apply.

The mobile station when receiving the DCI and scrambled error detection code from the base station, first performs an error detection check on the error detection code and the DCI, which includes the step of descrambling the error detection code. The mobile station performs the error check until determining the cell identifier actually used for the scrambling process of the error detection code in the base station.

From the determined cell identifier, the mobile station first learns that the DCI is a DCI for transporting the TDD configuration (and not any other kind of DCI); secondly, the mobile station learns which target cell (identified by the cell identifier) the TDD configuration (included in the DCI) actually is supposed to be applied to. From the DCI payload, the mobile station learns the TDD configuration.

Naturally, the mobile station applies the determined TDD configuration only in case it is belonging to the determined target cell identified by the cell identifier used for scrambling the error detection code for the DCI.

The second aspect may be used advantageously for a scenario in which there is one macro cell and various small cells; e.g. the macro cell is operated with frequency division duplex and the small cells with time division duplex. The mobile station is located in the macro cell as well as the small cell. It is assumed that the DCI (and error correction code) is transmitted from a base station of the macro cell, but for the purpose of dynamically changing the TDD configuration of one (or more) of the small cells.

For that purpose the cell identifier used for scrambling the error detection code for the DCI, may identify only one of the cells, for which the new TDD configuration shall apply. Alternatively, various small cells may be grouped together, and associated with a single cell (group) identifier, such that, upon receiving a DCI and error detection code scrambled with said single cell (group) identifier, the mobile stations may determine for which cell(s) the new TDD configuration shall apply and for which not.

Although as explained above the use of such a cell identifier for scrambling the error detection code already allows the mobile station to identify the DCI to be carrying a TDD configuration, the DCI may further comprise an invalid parameter to lower the false alarm risk. Specifically, when the base station generates a DCI for dynamically changing the TDD configuration of one (or more) cells, a TDD configuration parameter is included as well as parameter of the DCI is set to an invalid value. Which particular parameter is to be set to an invalid value, is less important as long as the mobile station may identify said parameter being invalid and thus deriving therefrom that the DCI is not a "conventional" DCI, but one carrying a TDD configuration. Correspondingly, the mobile station can gather from both the cell identifier used in connection with the error detection code, as well as from the invalid parameter of the DCI, that the DCI shall comprise further an indication as to the new TDD configuration which shall be applied.

One example for the invalid parameter, is the resource block assignment parameter of DCI Format 1C, as defined by 3GPP. The resource block assignment parameter is set to an invalid value of e.g. all "1"s.

As already explained in connection with the first aspect of the invention, the above-mentioned invalid parameter may be also used to encode further information; e.g. a further parameter value. Provided a plurality of invalid values are available for the invalid parameter, then all invalid values are associated with the information that the DCI carrying said invalid parameter is a DCI carrying one out of a plurality of TDD configurations. On the other hand, each (or a group) of the invalid values is associated with a different value of another parameter. Thus, further information can be transported to the mobile station without using further bits. For example, the actual TDD configuration can be encoded into the invalid parameter; at least seven different invalid parameter values need to be available to distinguish between the seven TDD configurations. Then, based on the particular invalid parameter value used in the DCI, the mobile station can determine the particular TDD configuration.

Instead of taking a known DCI Format (such as DCI Format 1C, defined by 3GPP), it is also possible to define a new DCI Format exclusively for the purpose of transporting the dynamic TDD re-configuration indication, and possibly further additional parameters as will be discussed later in more detail.

According to a third aspect of the invention, the TDD configuration is directly encoded into the DCI, similar to the second aspect of the invention. The DCI further comprises an invalid parameter, which allows the mobile station to detect that the received DCI is carrying a TDD configuration indication. Correspondingly, in case the mobile station determines that the DCI comprises said particular invalid parameter, it will proceed to determine the particular TDD configuration comprised in the DCI.

For the third aspect of the invention, it is assumed that any of the various known DCI Formats defined by 3GPP can be used, such a DCI Format 1C, already discussed for the first and second aspect of the invention. However, other formats may be used instead.

DCI Format 1C, as defined by 3GPP, conventionally includes a resource block assignment (RBA) parameter for the PDSCH assignment. For purposes of the third aspect, said RBA parameter may be set to an invalid value.

As with the previous aspects, further information may be encoded into said invalid parameter, provided a plurality of invalid values exist for the invalid parameter. While any of the invalid values indicates that the DCI (carrying said invalid parameter) serves the purpose of transporting the TDD configuration, each (or a group) of the invalid values is associated with further information. For example, the actual TDD configuration can be encoded into the invalid parameter; at least seven different invalid parameter values need to be available to distinguish between the seven TDD configurations. Then, based on the particular invalid parameter value used in the DCI, the mobile station can determine the particular TDD configuration.

A further improvement of the third aspect assumes that the error detection code for the DCI is scrambled with a so called system information identifier (SI-RNTI in 3GPP). The SI-RNTI is normally used in the 3GPP systems to transport system information, and different SI-windows are defined such that the mobile station can determine which system information message can be indicated in which SI-window (c.f. 3GPP TS 36.331, sections 5.2.1.2 and 5.2.3). According to 3GPP, only one SI message can be transmitted per SI-window, but multiple times within that SI-window (if necessary). Since the different SI-messages can be configured with different periodicities, it is possible that certain SI-windows are not used for any SI-message; in other words, the mobile station is aware that in such unused SI-windows no SI-message transmission will be performed by the base station. This mobile station knowledge is taken advantage of by transmitting the DCI transporting the TDD configuration within such an unused SI-window, although the CRC for the DCI is scrambled with the SI-RNTI. The reception within an unused SI-window, allows the mobile station, in combination with the invalid parameter, to determine that the DCI is transporting a TDD configuration with a higher certainty.

In a variant, a TDD-DCI reception window is defined, which is to be understood as restricting where the mobile station expects TDD-DCI message to just particular subframes and/or radio frames. In other words, a preferably periodic pattern of subframes and/or radio frames is defined as the TDD-DCI reception window, where the TDD configuration message can be transmitted by the base station, and/or only needs to be received and detected by the mobile station.

A first embodiment of the present invention provides a method for indicating one of a plurality of Time Division Duplex, TDD, configurations to a mobile station in a communication system. The TDD configuration defines uplink, downlink and special subframes within one or more radio frames. The mobile station receives from a base station a downlink control information and a corresponding error detection code for the downlink control information, wherein the error detection code is scrambled by the base station with an identifier associated with a TDD configuration. Then, the mobile station determines the identifier used for scrambling the error detection code of the downlink control information. The mobile station determines the TDD configuration from the identifier used for scrambling the error detection code of the downlink control information.

A first embodiment of the present invention provides a mobile station for processing one of a plurality of Time Division Duplex, TDD, configurations in a communication system. The TDD configuration defines uplink, downlink and special subframes within one or more radio frames. A receiving section of the mobile station receives from a base station a downlink control information and a corresponding error detection code for the downlink control information. The error detection code is scrambled by the base station with an identifier associated with a TDD configuration. A processor of the mobile station determines the identifier used for scrambling the error detection code of the downlink control information. The processor of the mobile station further determines the TDD configuration from the identifier used for scrambling the error detection code of the downlink control information.

A first embodiment of the present invention provides a base station for indicating one of a plurality of Time Division Duplex, TDD, configurations to a mobile station in a communication system. The TDD configuration defines uplink, downlink and special subframes within one or more radio frames. A processor of the base station decides on a TDD configuration, and generates a downlink control information and a corresponding error detection code for the downlink control information. The processor further scrambles the generated error detection code with an identifier associated with the decided TDD configuration. A transmitter transmits the generated downlink control information and scrambled error detection code to the mobile station.

A second embodiment of the present invention provides a method for indicating one of a plurality of Time Division Duplex, TDD, configurations to a mobile station for at least one target cell in a communication system. The TDD configuration defines uplink, downlink and special subframes within one or more radio frames. The mobile station receives from a base station of a first cell a downlink control information and a corresponding error detection code for the downlink control information. The error detection code for the downlink control information is scrambled by the base station with a target cell identifier associated with the at least one target cell for which the TDD configuration is to be applied. The mobile station determines the identifier used for scrambling the error detection code of the downlink control information. The mobile also determines the TDD configuration from the downlink control information, in case the determined identifier is the target cell identifier, and determines the at least one target cell to which to apply the determined TDD configuration from the target cell identifier used for scrambling the error detection code of the downlink control information.

A second embodiment of the present invention provides a mobile station for processing one of a plurality of Time Division Duplex, TDD, configurations in a communication system. The TDD configuration defines uplink, downlink and special subframes within one or more radio frames. A receiving section of the mobile station receives downlink control information and a corresponding error detection code for the downlink control information. The error detection code for the downlink control information is scrambled by the base station with a target cell identifier associated with the at least one target cell for which the TDD configuration is to be applied. A processor of the mobile station determines the identifier used for scrambling the error detection code of the downlink control information. The processor determines the TDD configuration from the downlink control information, in case the determined identifier is the target cell identifier. The processor determines the at least one target cell to which to apply the determined TDD configuration from the target cell identifier used for scrambling the error detection code of the downlink control information.

A second embodiment of the present invention provides a base station for indicating one of a plurality of Time Division Duplex, TDD, configurations to a mobile station in a communication system. The TDD configuration defines uplink, downlink and special subframes within one or more radio frames. A processor of the base station decides on a TDD configuration. The processor generates a downlink control information and a corresponding error detection code for the downlink control information, the downlink control information indicating the decided TDD configuration. The processor scrambles the generated error detection code with a target cell identifier associated with the at least one target cell for which the TDD configuration is to be applied. A transmitter transmits the generated downlink control information and scrambled error detection code to the mobile station.

A third embodiment of the present invention provides a method for indicating one of a plurality of Time Division Duplex, TDD, configurations to a mobile station in a communication system. The TDD configuration defines uplink, downlink and special subframes within one or more radio frames. The mobile station receives from a base station a downlink control information, wherein the downlink control information indicates the TDD configuration and further comprises an invalid parameter indicating that the downlink control information indicates one of a plurality of TDD configurations. The mobile station determines whether the received downlink control information comprises the invalid parameter. The mobile station determines the TDD configuration from the downlink control information, in case the received downlink control information comprises the invalid parameter.

A third embodiment of the present invention provides a mobile station for processing one of a plurality of Time Division Duplex, TDD, configurations in a communication system. The TDD configuration defines uplink, downlink and special subframes within one or more radio frames. A receiving section of the mobile station receives from a base station a downlink control information, wherein the downlink control information indicates the TDD configuration and further comprises an invalid parameter indicating that the downlink control information indicates one of a plurality of TDD configurations. A processor of the mobile station determines whether the received downlink control information comprises the invalid parameter. The processor further determines the TDD configuration from the downlink control information, in case the received downlink control information comprises the invalid parameter.

A third embodiment of the present invention provides a base station for indicating one of a plurality of Time Division Duplex, TDD, configurations to a mobile station in a communication system, the TDD configuration defining uplink, downlink and special subframes within one or more radio frames. A processor of the base station decides on a TDD configuration. The processor generates a downlink control information and a corresponding error detection code for the downlink control information, the downlink control information indicating the decided TDD configuration and comprising an invalid parameter indicating that the downlink control information indicates one of a plurality of TDD configurations. A transmitter of the base station transmits the generated downlink control information to the mobile station.

BRIEF DESCRIPTION OF THE SEVERAL VIEWS OF THE DRAWINGS

In the following the invention is described in more detail with reference to the attached figures and drawings.

FIG. 6 shows the seven currently-standardized TDD UL/DL configurations 0-6, the respective definitions of the 10 subframes and their switch-point periodicity, FIG. 7 illustrates the structure of a radio frame, being composed of two half-frames and 10 subframes, for a 5 ms switch-point periodicity.

DETAILED DESCRIPTION

Figure 1:
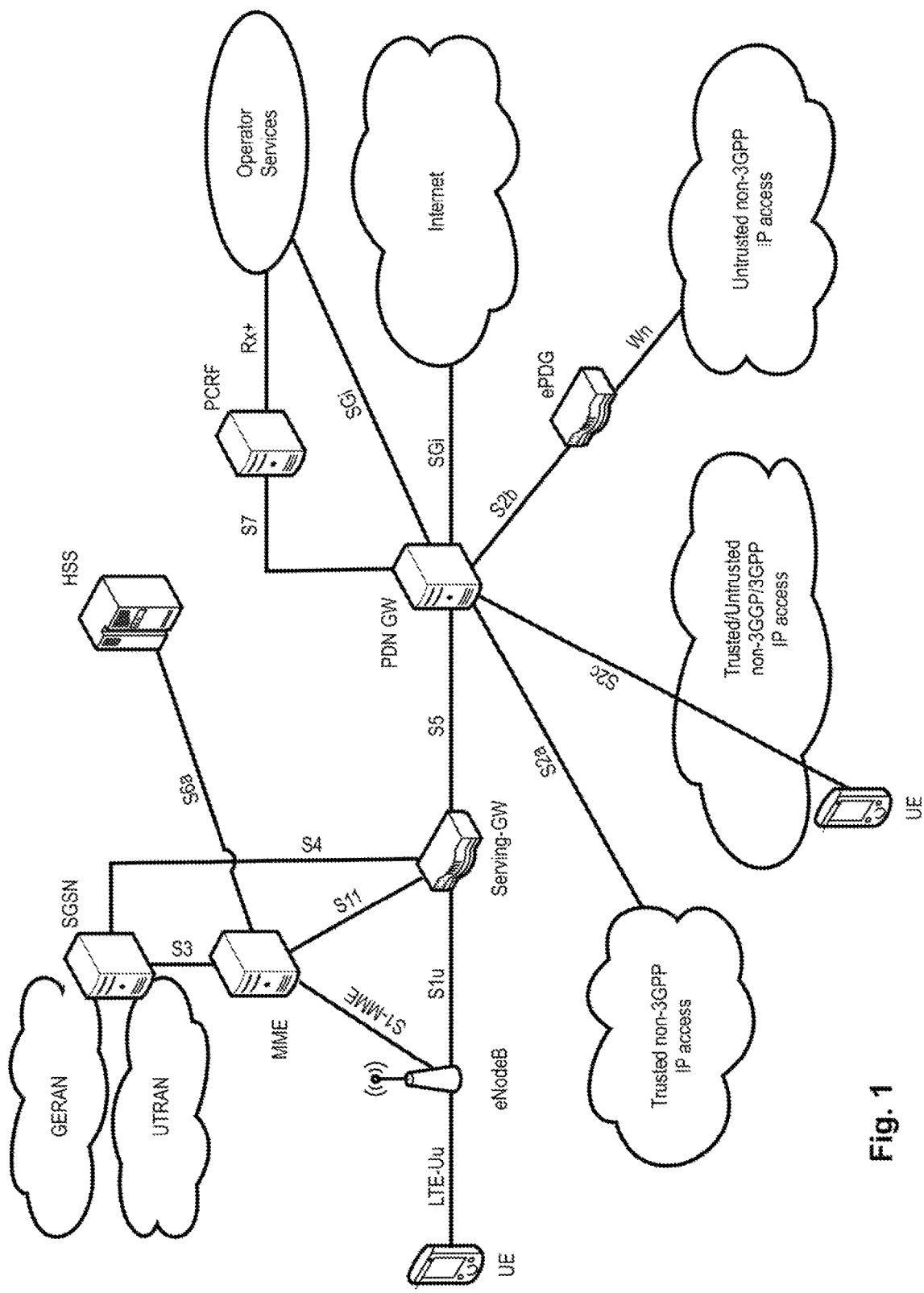
FIG. 1 shows an exemplary architecture of a 3GPP LTE system.
Figure 2:
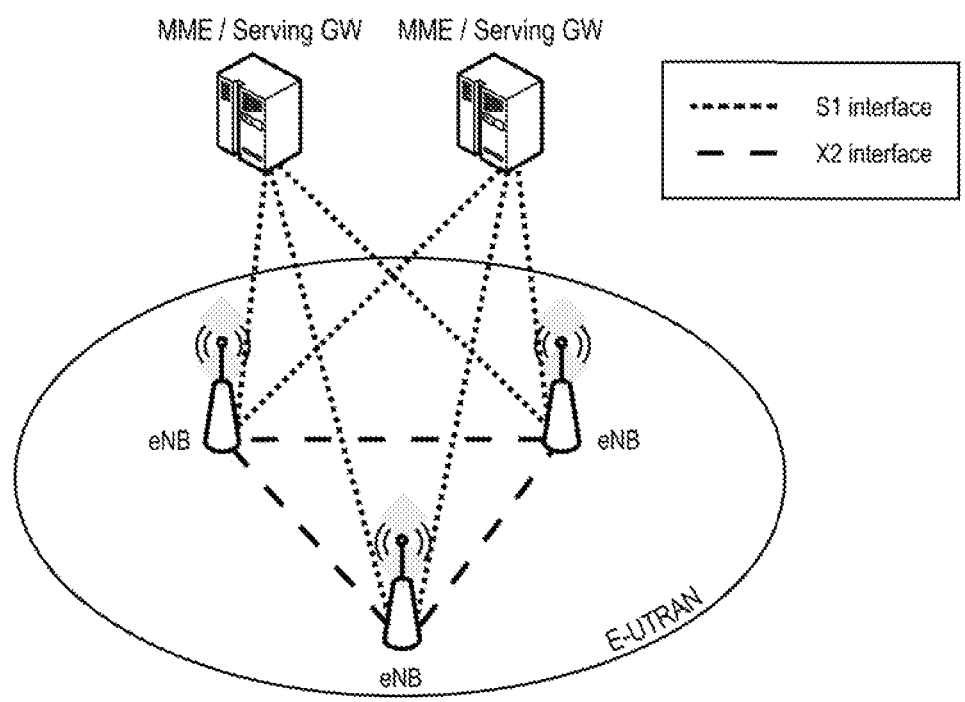
FIG. 2 shows an exemplary overview of the overall E-UTRAN architecture of 3GPP LTE.
Figure 3:
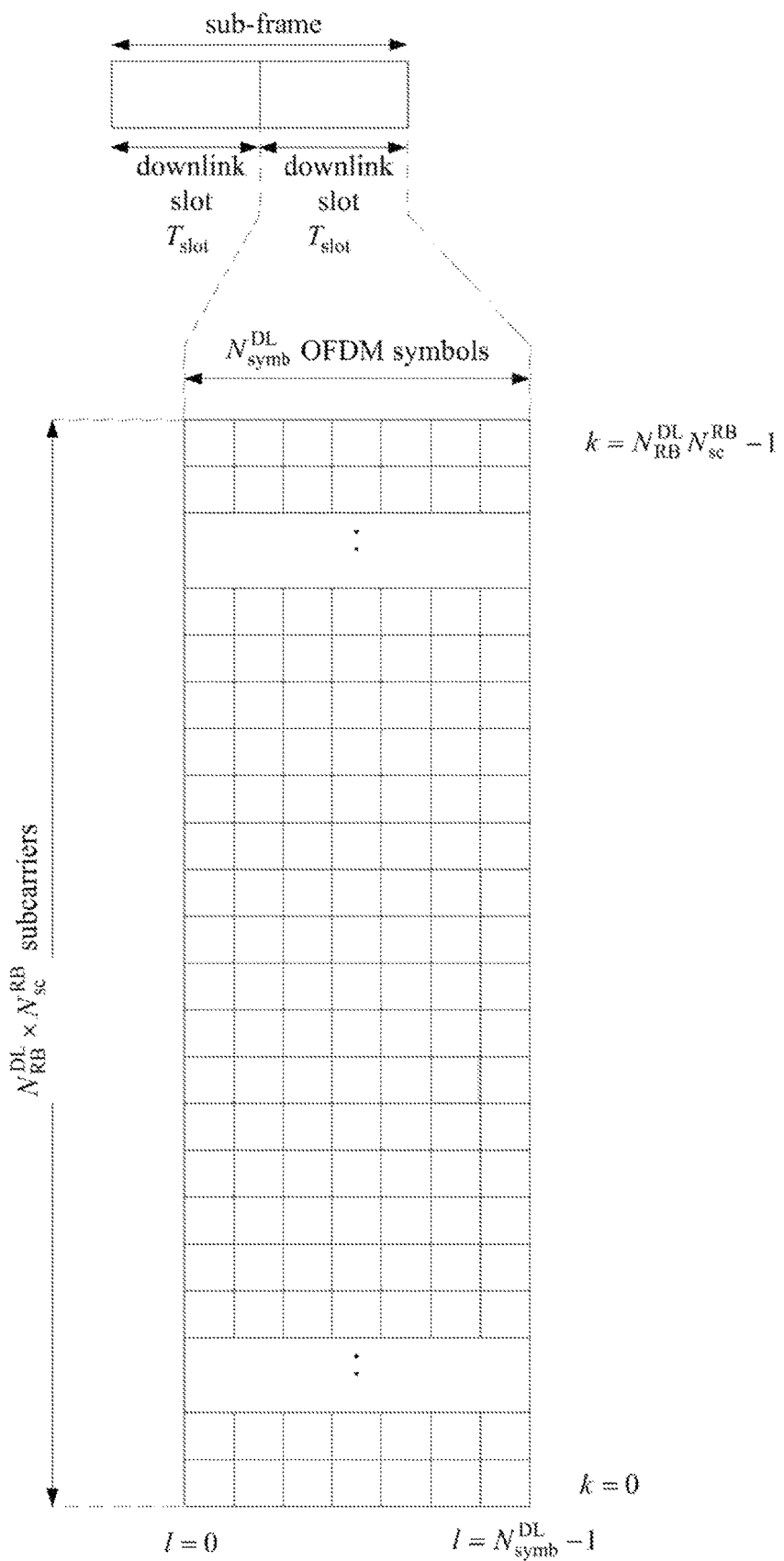
FIG. 3 shows exemplary subframe boundaries on a downlink component carrier as defined for 3GPP LTE (Release 8/9)
Figure 4:
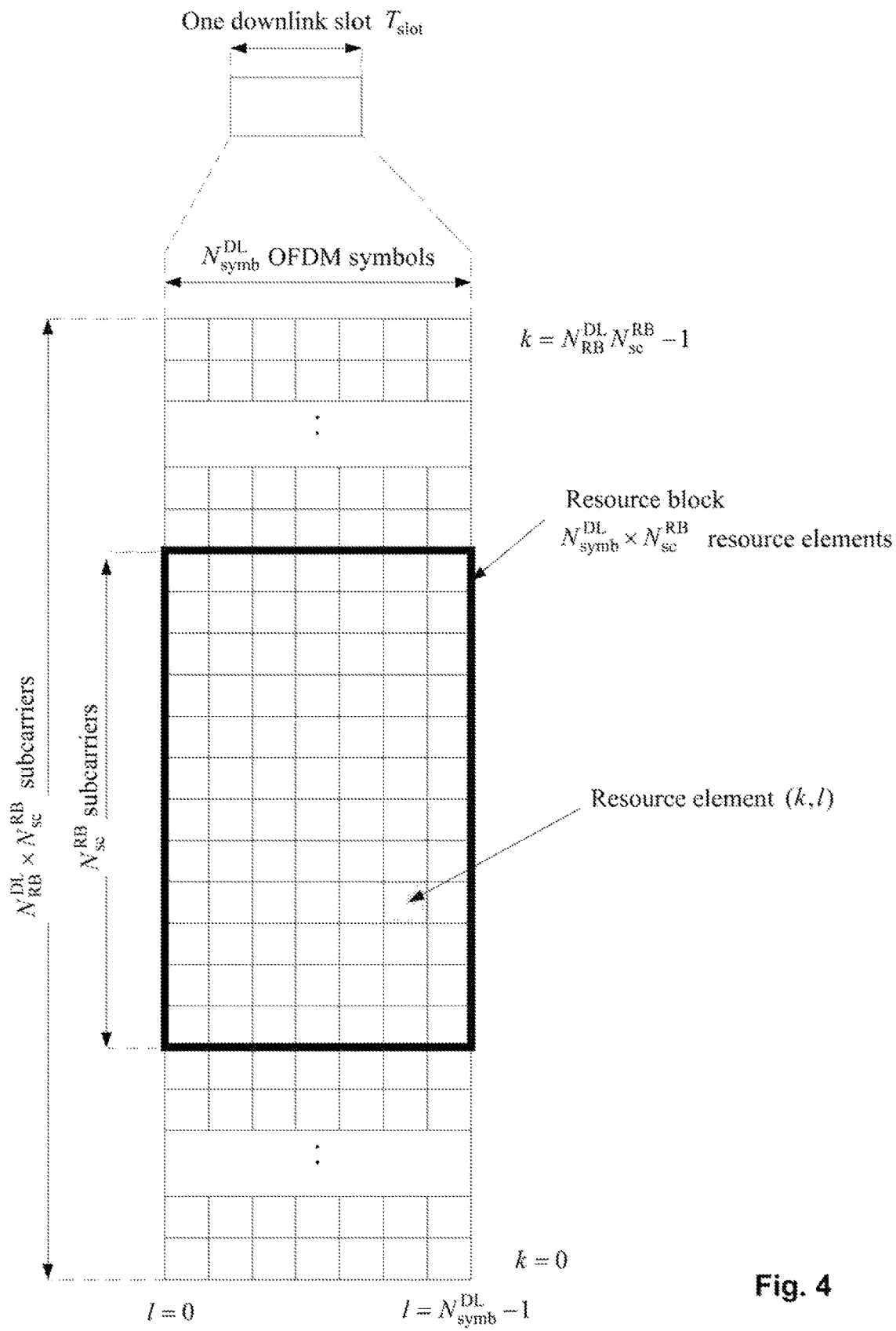
FIG. 4 shows an exemplary downlink resource grid of a downlink slot as defined for 3GPP LTE (Release 8/9), FIG. 5 exemplifies the processing structure for one downlink control information as defined by 3GPP.
Figure 5:
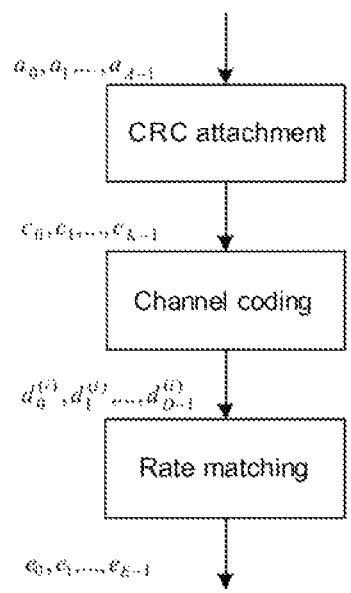

The following paragraphs will describe various embodiments of the invention. For exemplary purposes only, most of the embodiments are outlined in relation to a radio access scheme according to 3GPP LTE (Release 8/9) and LTE-A (Release 10/11/12) mobile communication systems, partly discussed in the Technical Background section above. It should be noted that the invention may be advantageously used for example in a mobile communication system such as 3GPP LTE-A (Release 10/11/12) communication systems as described in the Technical Background section above, but the invention is not limited to its use in this particular exemplary communication networks.

The term "TOD configuration" refers to the TDD uplink/downlink configuration as defined in the current standard, where the TDD configuration defines for each subframe of a radio frame whether same is a downlink, uplink or special subframe. The term "TDD configuration index" is a number (currently 0-6) respectively associated with one out of the seven possible TDD UL/DL configurations, and is defined in the technical standards of 3GPP (see FIG. 6).

The term "default TDD configuration" used in the claims and also throughout the description refers to the TDD configuration that is semi-statically configured in the system by using the SIB1 as explained in the background section. Put differently, the default TDD configuration is that one TDD configuration broadcast to all UEs in the communication area of the base station using the conventional mechanism of the system information acquisition and change procedure. Of course, the "default TDD configuration" can also be changed during communication, albeit not as dynamically as with the current invention, but with a long time cycle.

The term "scrambling" used in the claims in connection with the error detection code and used in the detailed description mainly in connection with a CRC (as an example of the error detection code) refers to the process of implicitly encoding e.g. an identifier into the error detection code (CRC). The term "masking" is assumed equivalent in this application.

The term "invalid parameter" used in the claims and the description shall be broadly understood as a parameter having an invalid value, thus constituting an invalid parameter.

In the following, several embodiments of the invention will be explained in detail. The explanations should not be understood as limiting the invention, but as mere examples of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

The various embodiments explained for the invention in general refer to TDD configurations and in particular introduce a fast mechanism for dynamically changing the TDD configuration from the default TDD configuration (configured through SIB) to a target TDD configuration.

As explained in the background section, the semi-static re-configuration of the TDD configuration of the prior art is slow and cumbersome and shall be enhanced by a dynamic process according to one of the various embodiments explained below.

The three following embodiments use the transmission of a DCI from a base station to indicate a change of the TDD configuration for one or more cells. The TDD configuration may be either implicitly encoded into said transmission (in the CRC, as for the first embodiment) or in a more direct way as a parameter of the DCI part (as for the second and third embodiment), or is encoded in a transport block that is indicated by the DCI.

First Embodiment

According to a first set of embodiments of the invention, the TDD configuration is encoded into the CRC of a DCI, both transmitted (usually broadcast) from the base station for a particular radio cell.

Figures 8, 9:
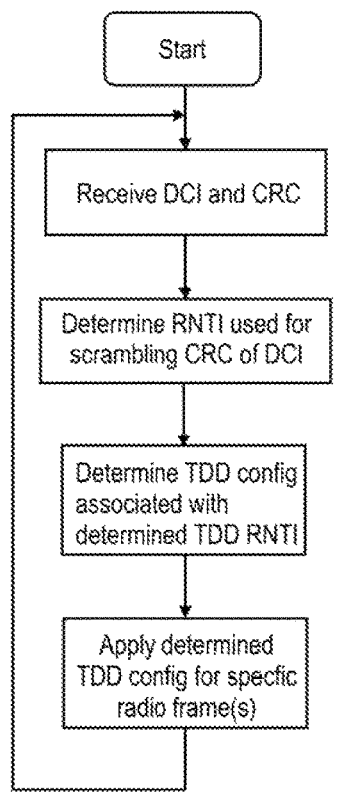
FIG. 8 shows the seven currently-standardized TDD UL/DL configurations 0-6, of FIG. 6, and an exemplary association with seven TDD-RNTIs according to a first embodiment.
FIG. 9 illustrates a basic flow diagram for the functioning of the mobile station according to a first embodiment of the invention.

To said end, seven different RNTIs are defined, e.g. at the base station or another network entity, each of the seven different RNTIs being associated with one of the seven TDD configurations, such that every TDD configuration 0-6 is associated with one different RNTI. FIG. 8 illustrates a possible association, where TDD_0-6_RNTIs are associated with the TDD configurations. The RNTI cost is thus strictly limited by the number of TDD configurations, and for instance not related to the number of small cells in the eLA scenario (see later, second embodiment). The TDD RNTIs are preferably 16-24 bit long and can be freely selected, but are preferably chosen from the range FFE0-FFFC in hexadecimal notation for the 16-bit case, and can be specified in a similar fashion as currently the M-RNTI, P-RNTI, SI-RNTI, or determined and configured by the base station and conveyed to mobile receivers by means of RRC configuration messages or system information transmission.

In one variation of the first embodiment (which also applies to the second and third embodiment), not all of the seven TDD configurations need to be associated. In that case, there is no need for seven different RNTIs, but e.g. four TDD-RNTIs suffice to distinguish between the necessary TDD configurations that shall be available for the dynamic TDD re-configuration according to the invention.

The TDD-RNTI—TDD-configuration associations can be specified in a similar fashion as currently the M-RNTI, P-RNTI, SI-RNTI, or determined and configured by the base station and conveyed to the mobile station(s); and possibly to the base station(s), in case a different network entity takes the decision. This may be done in various different ways, and the particular way used is not important for the functioning of the invention. For example, the association of the table in FIG. 8 can be transmitted using RRC messages, system information messages, or may be done during connection establishment. Correspondingly, both the base station and the mobile station have the information necessary to implement the dynamic TDD re-configuration according to the first embodiment.

The base station at a certain point in time may decide that the default TDD configuration is not optimal, and that another TDD configuration would be more beneficial. This may e.g. due to a different traffic situation or similar circumstances. The base station thus decides on a target TDD configuration (among the available remaining six TDD configurations), different from the default TDD configuration, and performs the dynamic TDD re-configuration as follows.

The base station after deciding on the new TDD configuration for a particular cell(s), generates a DCI (new, or of a known format, or of a known format but as an extension thereto, see below) and then calculates an error detection code (in 3GPP, a CRC is used as error detection code) for the generated DCI. In the prior art the CRC would be scrambled with any of the various RNTIs, depending on the kind of DCI that is transmitted. In this particular case, the CRC, calculated for the DCI, is scrambled with the TDD-RNTI associated with the decided target TDD configuration, e.g. with TDD_1_RNTI for TDD configuration 1 (see FIG. 8; and provided that the default TDD configuration is not TDD config 1). The actual scrambling of the CRC and TDD RNTI can be performed in the usual manner, as commonly known in the technical field and explained in the background section as an example for 3GPP LTE.

After the base station generated the DCI, calculated the CRC and scrambled the CRC with the corresponding TDD RNTI, the DCI and scrambled CRC are transmitted in the cell. The DCI/CRC message can be transmitted in the PDCCH or the ePDCCH, and preferably in the common search space thereof in case many or all mobile stations should be informed of the re-configuration. In other cases, a transmission in the UE specific search space can be more efficient because the transmission parameters can be tailored to the intended recipient and the respective prevailing transmission conditions.

According to one variant of the embodiment, one of the already available downlink control information messages as defined by 3GPP, and briefly discussed in the background section, is reused for said purpose. In other words, the base station reuses one of the DCI Formats 0, 1, 1A, 1B, 1C, 1D, 2, 2A, 2B, 2C, 2D, 3, 3A, 4 (as defined at the time of filing this application; or any other format defined by 3GPP in the future) for the dynamic TDD re-configuration instead of for the actually intended purpose of the particular DCI format message.

For instance, the DCI Format 1C message can be re-used, the Format 1C having the least number of bits out of all the available DCI formats. It should be noted that though in the following description also for the second and the third embodiments mainly the DCI format 1C is used for illustrating the invention's principles, other DCI formats may be re-used for the purposes of the invention.

The DCI Format 1C is defined in 3GPP to include the following fields:

| | |
|---|---|
| resource block assignment (RBA) | 3-9 bits (bandwidth dependent) |
| Modulation and coding scheme (MCS) | 5 bits |
| Gap Value indication | 1 bits (only if bandwidth >= 50 PRB) |

A more detailed discussion on the DCI Format 1C content can be found in 3GPP TS 36.212 Chapter 5.3.3.1.4, incorporated hereby by reference. Thus, the DCI format 1C message can be between 8 and 15 bits long.

Correspondingly, instead of sending the above parameters for the PDSCH assignment as intended for the DCI Format 1C, the base station may include other parameters into the DCI. This partly depends on the bandwidth in the cell, since the amount of bits available in the DCI Format 1C depends on the bandwidth. These other parameters to be included in the DCI Format 1C may comprise at least one of the following:

- a target cell identifier, identifying the target cell for which the TDD configuration as implicitly encoded into the CRC of the DCI shall be applied,
- a HARQ instruction, for instructing the mobile station(s) to reset or not reset the HARQ protocol upon applying the new TDD configuration,
- a lifetime parameter for the encoded TDD configuration, indicating to the mobile station(s) the amount of time said TDD configuration shall be applied, before switching back to the default TDD configuration,
- a padding field with a pre-defined bit value (virtual CRC), which can be used to "fill" the DCI, such that the remaining, otherwise unused bits, are put to good use so as to lower the false alarm risk
- a buffer status report (BSR) procedure instruction, instructing to cancel a pending BSR procedure or to trigger a new BSR procedure, upon applying the indicated TDD configuration,
- a scheduling request (SR) procedure instruction, instructing to cancel a pending SR procedure or to trigger a new SR procedure, upon applying the indicated TDD configuration,
- a random access channel (RACH) procedure instruction, instructing to cancel a pending RACH procedure or to trigger a new RACH procedure, upon applying the indicated TDD configuration,
- a power headroom reporting (PHR) instruction, instructing to cancel a pending PHR or to trigger a new PHR, upon applying the indicated TDD configuration.

These parameters are only briefly discussed above for illustration purposes and will be explained in more detail later.

When using such a known DCI format, it is also possible for the base station to set one of the parameters defined for said known DCI format to an invalid value and to thus use the invalid parameter as an "escape codepoint" for indicating to the mobile station that the DCI carrying the invalid parameter is not conventional but carries a TDD UL/DL configuration indication. The DCI message thus includes said particular (invalid) parameter, as a conventional DCI message, however with an invalid value. This invalid value is known to both the base station and the mobile station. Assuming as an example the already standardized DCI format 1C, the resource block assignment parameter can be set to an invalid value, such as all bit values being "1".

An invalid value for a parameter or a parameter combination can be generally characterized as representing a state that is reserved or contradicts requirements on the indicated parameter. For example, an invalid resource block assignment value is one that would result in the assignment of at least one resource block with a negative index or of at least one resource block outside of the available resource blocks. Another invalid value example refers to a HARQ process number parameter in case of TDD with a HARQ index that indicates a HARQ process beyond the defined maximum number of HARQ processes as specified in 3GPP TS 36.213 Table 7-1. An example of an invalid parameter combination where a value is representing a reserved state is the 'Precoding information' as available e.g. in DCI format 2, where depending on the number of indicated transport blocks, different precoding information values are defined as 'reserved', and where the number of indicated transport blocks depends on the combination of the indicated modulation and coding scheme and redundancy version, as specified in 3GPP TS 36.213 chapter 7.1.7.2.

For resource allocation type 2, at least one RBA state is invalid for all downlink bandwidths 6-110 PRBs, namely when all bit values are set to "1". For 10 and 13 PRBs, there is exactly one invalid state, the already mentioned all bits=1. For 6 PRBs, there are 2 invalid RBA values. For 15 PRBs, there are 4 invalid RBA values. For 25 PRBs, there are 50 invalid RBA values. For 50 PRBs, there are 62 invalid RBA values for gap 1, and 83 invalid RBA values for gap 2. For 75 PRBs, there are 120 invalid RBA values, and for 100 and 110 PRBs, there are 212 invalid RBA values.

Especially, when having a bandwidth where there are more than one invalid values (i.e. all but for 10 and 13 PRBs, which are however of lower importance in practice), additional information could be encoded into this invalid parameter of the DCI, besides the indication that the DCI carrying the invalid parameter carries a TDD UL/DL configuration indication. The additional information may be one of the above-mentioned other parameters, namely at least one of a target cell identifier, a HARQ instruction and a lifetime parameter, BRS instruction, SR instruction, RACH instruction and PHR instruction. Of course, if one of these parameters is encoded into the invalid parameter, then, the DCI does not need to include said particular parameter separately in its payload.

For example, taking the bandwidth of 15 PRB, with the 4 invalid RBA values, all of the 4 invalid RBA values indicate to the mobile station that the DCI carrying said invalid RBA value, includes an indication as to the dynamic TDD configuration. Further, each particular invalid RBA value might be further associated with one different lifetime parameter (e.g. 10 ms, 40 ms, 100 ms and 200 ms), or distinguish between different target cells for which the TDD configuration shall apply (e.g. PCell, SCell1, SCell2 or SCell3).

Alternatively, 2 of the invalid RBA values are associated with the reset-HARQ instruction and the other 2 invalid RBA values are associated with the do-no-reset-HARQ instruction. Similar considerations apply for the other bandwidths; e.g. when only 2 invalid states are available for the RBA parameter, then, only two different states of the additional information can be encoded, such as the HARQ instruction, or the lifetime parameter (e.g. distinguishing between the valid periods of 10 ms and 40 ms).

As an alternative to reusing a known DCI format (such as Format 1C), it is also possible to make an extension to the known DCI format, such that the known DCI format is used only for particular cases, and another "version" of the known DCI format is used for other particular cases. For instance, it would be possible to adapt a known DCI format (such as Format 1C) to be only applicable for particular radio frames or subframes within particular radio frames, and to include a definition that defines the known DCI format to be used for dynamic TDD UL/DL re-configuration for other radio frames or other subframes within particular radio frames, where depending on the "version", the DCI format may contain different information elements.

Alternatively to the above, it is also possible to use a DCI format specifically defined for the purpose of dynamic TDD re-configuration; e.g. also being of a different size than the already-defined DCI formats. In said case, the amount of bits of the DCI does not depend on the cell bandwidth, but can be defined freely depending on the parameters that are to be transmitted in this new DCI. For example, a DCI Format 1E can be defined that includes at least one of the above-listed parameters (target cell identifier, HARQ instruction, lifetime parameter, padding field, BSR instruction, SR instruction, RACH instruction, PHR instruction).

In summary, the base station transmits the DCI and scrambled CRC in his cell, and the mobile station(s) in the cell receive the DCI and scrambled CRC. The processing of the DCI and CRC according to this first embodiment is explained in connection with FIG. 9, which shows a flow diagram of the mobile station for a basic first embodiment of the invention.

The mobile station listens on the PDCCH and EPDCCH to detect DCI messages, intended for the mobile station. After receiving the DCI and CRC from the base station, the mobile station proceeds to determine the RNTI with which the CRC was scrambled. The particular error detection check and descrambling may be performed in the usual manner, as discussed exemplary in the background section for 3GPP LTE. For example, the mobile station performs an error detection check for the DCI, based on the CRC, the DCI and various possible candidate identifiers that may have been used to scramble the DCI, amongst these the seven TDD RNTIs. For only one of the RNTIs, the CRC check performed by the mobile station is successful. Thus, the mobile station determines that the particular one TDD RNTI was used for scrambling.

The mobile station then proceeds to determine with which TDD configuration the determined TDD RNTI is associated by e.g. referencing the table as defined in FIG. 8. Thus, for example the mobile station determines it shall switch to the TDD configuration 1, instead of continuing to use the default TDD configuration.

The thus determined TDD configuration is then applied by the mobile station for a particular time. This may be either pre-defined to be a fixed amount of time, such as 1, 2 or 4 radio frames. Alternatively, the time can be dynamically indicated, e.g. by using the lifetime parameter already mentioned before as (optionally) being part of the DCI payload or being encoded into the invalid parameter (see above). Assuming that the mobile station receives the DCI/CRC transmission in radio frame n, it then correspondingly processes the DCI and CRC, and applies the indicated TDD configuration for a particular number of radio frames n+1, n+2, n+3 etc, depending on the lifetime parameter in the DCI or the pre-defined fixed amount of time. After the dynamically indicated TDD configuration "expires", i.e. shall no longer be applied, the mobile station switches back to the default TDD configuration until for example it receives another TDD DCI for dynamic TDD UL/DL re-configuration.

Alternatively, the mobile station can also proceed to apply the new TDD configuration until it receives another TDD re-configuration; in other words, the new TDD configuration is not specified for a particular amount of time but indefinitely until instructed otherwise.

The mobile station may also determine further parameters from the DCI, depending on whether the DCI includes same. For instance, the mobile station may determine the target cell, the HARQ instruction, lifetime parameter, padding field value, BRS instruction, SR instruction, RACH instruction and/or PHR instruction therefrom.

Details as to how the information gained from these additional parameters is used, is explained later separately in connection with these parameters.

According to a further variant of the first embodiment, the CRC of the DCI is scrambled by a TDD-RNTI, although only one TDD-RNTI would be required to be defined for this purpose instead of multiple TDD-RNTIs, where the DCI assigns physical resources for transmission of a transport block, in a similar fashion as e.g. currently DCI format 1A can be used to assign physical resources for a transport block. Said transport block can then represent a MAC or RRC message, which contains information and parameters about the TDD (re-)configuration as e.g. outlined in the later sections of the present application. In other words, instead of (or in addition to) using the DCI payload to indicate one or more TDD configuration parameters, the RNTI is used to identify that a reconfiguration message is transmitted, and the DCI payload gives information about the transport block that carries the TDD configuration parameter(s).

Second Embodiment

The second embodiment of the invention mainly differs from the first embodiment explained above in that the TDD UL/DL configuration is not encoded into the RNTI used for scrambling the CRC of the DCI, but instead a TDD UL/DL configuration indication is included into the DCI payload. Most of the remaining details however remain the same between the first and second embodiments.

The TDD UL/DL configuration indication in the DCI distinguishes between the 7 different TDD UL/DL configurations of FIG. 6; thus, a 3-bit field suffices to indicate the particular TDD UL/DL configurations, where each indication value is associated with one of the TDD configurations. Again, it is also possible to distinguish between less TDD UL/DL configurations, such that already a 2-bit (or even a 1-bit) field suffices; however, with the disadvantage that the dynamic TDD re-configuration is not so flexible.

Figures 10, 11:
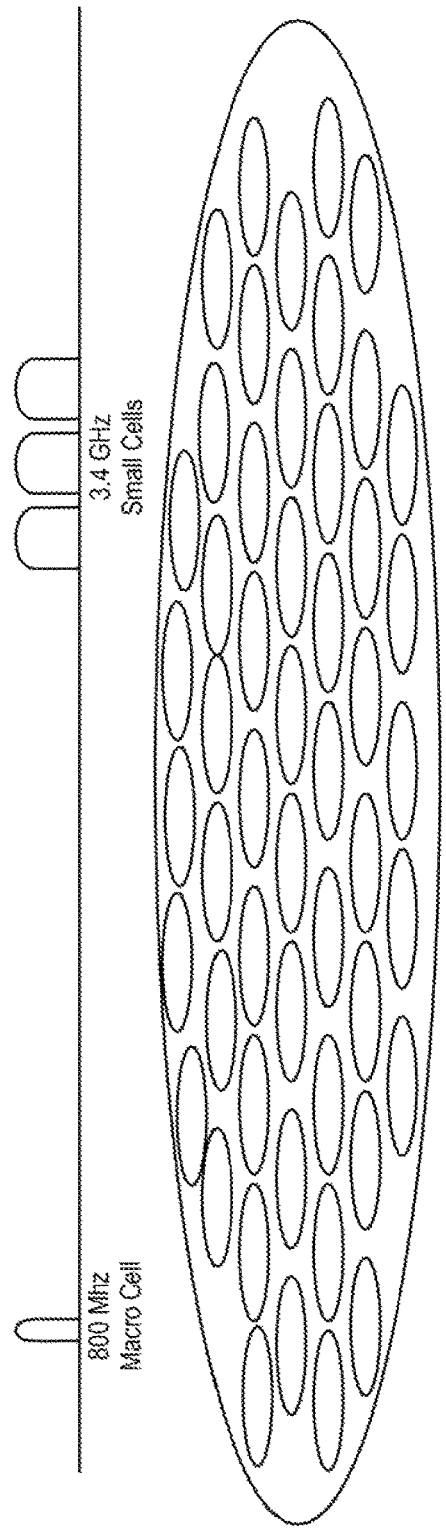
FIG. 10 shows the seven currently-standardized TDD UL/DL configurations 0-6, of FIG. 6, and an exemplary association with seven TDD configuration indication values according to a second and third embodiment, FIG. 11 schematically illustrates a scenario with many small cells and one macro cell, termed enhanced Local Area.

The association between the 3-bit values and the TDD configurations can be defined by the base station or another network entity. An exemplary association for all seven TDD configurations using a 3-bit TDD indication field is illustrated in FIG. 10. Information on the associations between the TDD configuration indication values and the actual TDD configurations is informed to the mobile station; and possibly to the base station(s), in case a different network entity takes the decision. As with the first embodiment, the informing procedure may be done in various different ways; e.g. using RRC messages, system information messages, or may be done during connection establishment. Correspondingly, both the base station and the mobile station have the necessary information to implement the dynamic TDD re-configuration of the invention.

As for the first embodiment, the base station decides to change the TDD UL/DL configuration from the default TDD configuration to another target TDD configuration, e.g. for the reason that the target TDD configuration is better suited for the current traffic. The base station thus wants to perform a dynamic TDD re-configuration and generates a DCI including the above-mentioned TDD UL/DL configuration indication.

The base station thus generates a DCI for the dynamic TDD re-configuration, wherein the DCI includes the TDD configuration indication, indicating the TDD configuration which the base station decided. Also as already explained for the first embodiment in detail, the DCI may include further parameters, such as at least one of the HARQ instruction, the lifetime parameter, the padding field, BRS instruction, SR instruction, RACH instruction and PHR instruction.

In the same way as for the first embodiment, the DCI generated by the base station, can be one of the already available downlink control information messages as defined by 3GPP (e.g. the DCI Formats 0, 1, 1A, 1B, 1C, 1D, 2, 2A, 2B, 2C, 2D, 3, 3A, 4). In this case, instead of sending the usual parameters of the defined DCI Format (such as RBA, MCS, Gap value Indication for Format 1C), the base station includes other parameters. As explained above, the TDD configuration indication field is included.

When using a known DCI format, it is also possible for the base station to set one of the parameters defined for said known DCI to an invalid value. The invalid parameter indicates the mobile station that the DCI carrying the invalid parameter, further carrier a TDD UL/DL configuration indication. This has been explained in detail for the first embodiment, and the same principles apply to the second embodiment too, and are not repeated for sake of conciseness. Instead, the reader is kindly pointed to the corresponding passages of the first embodiment.

Furthermore, the invalid parameter may not only be understood as indicating to the mobile station that the DCI carries a TDD UL/DL re-configuration indication, but this invalid parameter may encode a further parameter, such as the particular TDD UL/DL re-configuration indication, or any of the other parameters mentioned above: HARQ instruction, lifetime parameter, BRS instruction, SR instruction, RACH instruction, PHR instruction. This is very similar to the use of the invalid parameter for the first embodiment, except that the invalid parameter for the first embodiment may encode the target cell identifier, but not the TDD configuration indication, whereas this is the other way round for the second embodiment.

Alternatively to reusing a known DCI format (such as format 1C), it is also possible to make an extension to the known format, as already explained for the first embodiment. To avoid repetition, the reader is referred to the corresponding sections of the first embodiment.

As a further alternative, it is also possible to use a DCI format specifically defined for the purpose of dynamic TDD re-configuration, e.g. with a different size. Again, the reader is referred to the corresponding sections of the first embodiment.

Independently from the actually used DCI format and independently from whether the DCI includes or not further parameters, the base station calculates an error detection code for the thus generated DCI. According to the second embodiment, the error detection code (CRC) is then scrambled with a cell identifier, identifying the target cell(s) for which the dynamic TDD re-configuration is to be applied. The cell identifier can also be termed SC-RNTI, Small Cell-RNTI.

Since the cell identifier for scrambling with the CRC is assumed to have the same length as the CRC, i.e. is expected to be 16-24 bit long, it is particularly suitable to distinguish between many different cells and thus can preferably be used in scenarios where there are a lot of cells. The 16-24 bit cell identifier values can be flexibly associated with either single cells or different group of cells. This has the advantage that the base station can flexibly perform the TDD re-configuration for either single cells (e.g. SCell1) and/or group of cells (e.g. neighboring cells, SCell1-SCell10) by using the particular target cell identifier value associated therewith. Also, one of the available target cell identifiers may also identify all cells as target cells. The association between the target cell identifier values and the target cell (groups) can be decided in the base station, or another network entity, and then should be informed to the mobile station (and the base station), such that both the base station and the mobile station have the same information necessary for the dynamic TDD re-configuration according to the second embodiment. As for the first embodiment, it is not possible to use all of the available RNTI values (65536 different values are available for the case of a 16-bit RNTI), since some of them are already reserved for other purposes. Alternatively, the associations may be pre-defined and fixed by the standard.

Figure 12:
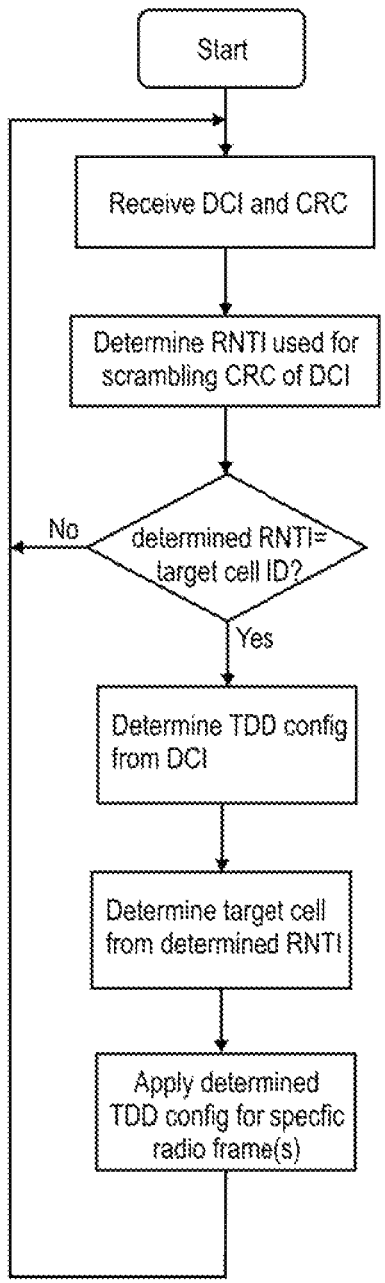
FIG. 12 illustrates a basic flow diagram for the functioning of the mobile station according to the second embodiment.

Current mechanisms, such as carrier indication fields, only support 8 different cells at most. LTE-Advanced however shall support enhanced Local Area (eLA), where many tens of small cells could be within coverage of a macro cell. This is schematically illustrated in FIG. 11, where a large-coverage macro cell is operated around 800 MHz, and within many small-coverage cells are operated around 3.4 GHz. In such a cell deployment, it may be necessary for a mobile station to differentiate between more than 7 small cells especially if the mobile station is moving through the coverage area of the macro cell and should perform radio measurements on a multitude of small cells to determine the one with the most favorable radio conditions In summary, the base station transmits the DCI and scrambled CRC for the DCI, and the mobile stations located in the cell receive the DCI and scrambled CRC. The processing of the DCI and CRC in the mobile station according to the second embodiment is explained with reference to FIG. 12.

The mobile station listens on the PDCCH and EPDCCH to detect DCI messages, intended for the mobile station. Thus, the mobile station receives the DCI and CRC from the base station, and determines the RNTI with which the CRC was scrambled. The particular error detection check and descrambling may be performed in the usual manner, as discussed exemplary in the background section for 3GPP LTE. For example, the mobile station performs an error detection check for the DCI, based on the CRC, the DCI and various possible candidate identifiers that may have been used to scramble the DCI, amongst these the target cell identifiers. For only one of the RNTIs, the CRC check performed by the mobile station is successful. Thus, the mobile station determines that one of the particular target cell identifiers was used for scrambling.

From the fact that a target cell identifier was used for scrambling the CRC, the mobile station can already deduce that the DCI further indicates a TDD configuration for performing a dynamic TDD re-configuration. Correspondingly, the mobile station then proceeds to determine the particular TDD configuration encoded into the DCI in one of the different ways as explained above. Thus, the mobile station may either read an actual TDD configuration indication field value, as shown in FIG. 10, and associate the value with a corresponding TDD configuration; or, the mobile station determines an invalid parameter value, and determines from the invalid parameter value the associated TDD configuration.

Furthermore, the mobile station determines from the determined target cell identifier, the particular target cell, or group of cells, for which the encoded TDD configuration is intended and shall be applied. The TDD re-configuration is only to be applied by a mobile station, if the mobile station is actually belonging to the identified target cell. Otherwise, the TDD re-configuration can be ignored by the mobile station.

If included in the DCI, the mobile station may determine the further parameters from the DCI payload, e.g. the lifetime parameter, the HARQ instruction, padding field value, BRS instruction, SR instruction, RACH instruction and/or PHR instruction. Details as to how the information gained from these additional parameters is used, is explained later separately in connection with these parameters.

The thus determined TDD configuration is then applied by the mobile station for a particular time. As with the first embodiment, this may be either pre-defined to be a fixed amount of time, such as 1, 2 or 4 radio frames. Alternatively, the time can be dynamically indicated, e.g. by using the lifetime parameter already mentioned before as being (optionally) part of the DCI payload or being encoded into the invalid parameter (see above). Assuming that the mobile station receives the DCI/CRC transmission in radio frame n, it then correspondingly processes the DCI and CRC, and applies the indicated TDD configuration for a particular number of radio frames n+1, n+2, n+3 etc, depending on the lifetime parameter in the DCI or the pre-defined fixed amount of time. After the dynamically indicated TDD configuration "expires", i.e. shall no longer be applied, the mobile station switches back to the default TDD configuration until for example it receives another TDD DCI for dynamic TDD UL/DL re-configuration.

Alternatively, the mobile station can also proceed to apply the new TDD configuration until it receives another TDD re-configuration; in other words, the new TDD configuration is not specified for a particular amount of time but indefinitely until instructed otherwise.

According to a variant of the second embodiment, the CRC of the DCI is scrambled by an SC-RNTI, and the DCI assigns physical resources for transmission of a transport block, in a similar fashion as e.g. currently DCI format 1A can be used to assign physical resources for a transport block. Said transport block can then represent a MAC or RRC message, which contains information and parameters about the TDD (re-)configuration as e.g. the desired TDD configuration, or the target cell index, or other parameters outlined in the later sections of the present application.

Third Embodiment

The third embodiment of the invention is similar to the first and second embodiment in that it deals with dynamic TDD UL/DL re-configuration using the transmission of a DCI/CRC. Further, similar to the second embodiment, the TDD UL/DL configuration is not implicitly encoded into the RNTI, used for scrambling the CRC, but instead is included in the DCI payload. However, according to the third embodiment a target cell identifier (SC-RNTI) is not used for scrambling the CRC of the DCI. However, the DCI includes an invalid parameter to indicate to the mobile station that the DCI further includes an indication as to a TDD configuration. In other words, the invalid parameter already discussed in connection with the first and second embodiments as being an optional parameter of the DCI, is for the third embodiment always included in the DCI payload.

Otherwise, many details already discussed for the first and second embodiments remain the same for the third embodiment. For said reason, repetitions are avoided where possible, and the reader is referred to the corresponding passages of the first and/or second embodiment.

In the same way as for the second embodiment, the TDD UL/DL configuration indication in the DCI distinguishes between all the 7 different TDD UL/DL configurations of FIG. 6; or alternatively, may distinguish between less TDD UL/DL configurations. Correspondingly, a TDD UL/DL configuration indication can be defined as exemplary depicted in FIG. 10. To avoid repetition, the reader is referred to the sections of the second embodiment explaining in detail the TDD UL/DL configuration indication; which may be included as a separate parameter in the DCI payload, or may be encoded into the invalid parameter when enough invalid values are available as explained before. In any case, the base station and mobile station shall have a common understanding on how the different TDD configurations may be indicated using the DCI.

As already discussed for the first and second embodiments, the base station at a certain time may decide to change the TDD UL/DL configuration from the default TDD configuration to another TDD UL/DL configuration, e.g. for the reason that the TDD configuration is better suited for the current traffic. The base station thus wants to perform a dynamic TDD re-configuration as will be explained below in connection with the third embodiment.

The base station generates a DCI, wherein the DCI includes the TDD configuration indication, for indicating the TDD configuration which the base station decided. As explained for the first and second embodiments in detail, the DCI may optionally include further parameters; for this particular third embodiment: the target cell identifier, the HARQ instruction, the lifetime parameter, the padding field, BRS instruction, SR instruction, RACH instruction and/or PHR instruction.

Since the DCI according to the third embodiment always includes the invalid parameter, the DCI generated by the base station should be one of the already-available downlink control information messages as defined by 3GPP (e.g. the DCI Formats 0, 1, 1A, 1B, 1C, 1D, 2, 2A, 2B, 2C, 2D, 3, 3A, 4). This already defined DCI message is then re-used for the purpose of carrying the TDD indication configuration.

Furthermore, for the case where there are several invalid values available for the invalid parameter (especially for larger bandwidths), then it is possible to encode at least one of the above-mentioned further parameters into the invalid parameter, in a similar manner as for the first and second embodiment.

For example, assuming the case where the DCI Format 1C is used, having the least number of bits, the RBA parameter of DCI format 1C can be used as the invalid parameter and can be set to an invalid value. As explained for the first embodiment in detail, the RBA parameter can take a different number of invalid values depending on the bandwidth used in the cell. One invalid value is the same for all bandwidths, namely where all bits of the RBA parameter are set to one. For most bandwidths however, the RBA parameter can take several invalid values; for 6 PRBs, there are 2 invalid RBA values; for 15 PRBs, there are 4 invalid RBA values; for 25 PRBs, there are 50 invalid RBA values; for 50 PRBs, there are 62 invalid RBA values for gap 1, and 83 invalid RBA values for gap 2; for 75 PRBs, there are 120 invalid RBA values, and for 100 and 110 PRBs, there are 212 invalid RBA values.

Additional information could be encoded into this invalid parameter of the DCI, besides the indication that the DCI carrying the invalid parameter carries a TDD UL/DL configuration indication. The additional information may be one of the above-mentioned other parameters, namely at least one of a TDD configuration, target cell identifier, a HARQ instruction, a lifetime parameter, BRS instruction, SR instruction, RACH instruction and PHR instruction. Of course, if one of the mentioned parameters is encoded into the invalid parameter, then, the DCI does not need to include said particular parameter separately in its payload.

Therefore, in one variant of the third embodiment (and actually also of the second embodiment), the DCI format 1C for dynamic TDD re-configuration includes the RBA parameter set to an invalid value (but encoding the particular TDD configuration) and a padding field for the remaining bits, the padding field being set to a pre-defined value and serving as a virtual CRC.

The base station generates the DCI as explained above, and then calculates an error detection code (CRC) for the thus generated DCI. The CRC is scrambled by the base station with an RNTI; which RNTI is used is not important for the functioning of the third embodiment, however it is advantageous for the mobile station to limit the operation to only one or a restricted RNTI value(s) in order to minimize the risk of erroneously detecting a successful DCI transmission due to transmission errors. An advantageous variant of the third embodiment, where the SI-RNTI is used for scrambling will be explained in detail further below.

Figure 13:
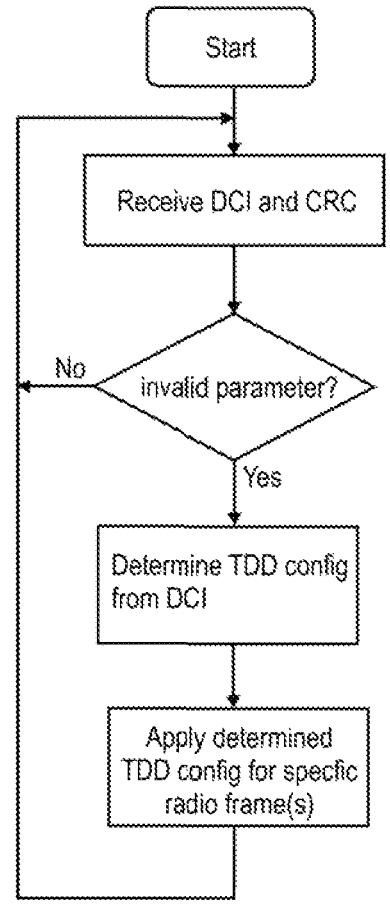
FIG. 13 illustrates a basic flow diagram for the functioning of the mobile station according to the third embodiment.

The base station transmits the DCI and scrambled CRC for the DCI, and the mobile station(s) located in the cell receive the DCI and scrambled CRC. The processing of the DCI and CRC by the mobile station according to the third embodiment is explained with reference to FIG. 13.

The mobile station listens on the PDCCH and EPDCCH to detect DCI messages, intended for the mobile station. Thus, the mobile station receives the DCI and CRC from the base station. The CRC is descrambled and the content of the DCI is processed.

The mobile station then determines whether the DCI comprises an invalid parameter, and in case it does, the mobile station deduces that the DCI is not a conventional DCI, but is used by the base station for the dynamic TDD re-configuration and thus indicates a particular TDD configuration. The mobile station then proceeds to determine the particular TDD configuration encoded into the DCI in one of the different ways as explained above. Namely, the mobile station may either read an actual TDD configuration field value, as shown in FIG. 10, and associate the value with a corresponding configuration; or the mobile station determines the invalid parameter value, and associates the particular invalid parameter value with the corresponding TDD configuration.

Furthermore, depending on whether the DCI includes further parameters, the mobile station may determine the value of any other parameter in the DCI, such as the target cell(s), the lifetime, an HARQ instruction, BRS instruction, SR instruction, RACH instruction and/or PHR instruction; be the other parameter encoded into the invalid parameter or being present as a separate parameter in the DCI payload For example, the mobile station determines from the determined target cell identifier, the particular target cell, or group of cells, for which the encoded TDD configuration is intended and shall be applied. The TDD re-configuration is only to be applied by a mobile station, if the mobile station is actually belonging to the identified target cell. Otherwise, the TDD re-configuration can be ignored by the mobile station. Details as to how the information gained from these additional parameters is used, is explained later separately in connection with these parameters.

The thus determined TDD configuration is then applied by the mobile station for a particular time. As with the first embodiment, this may be either pre-defined to be a fixed amount of time, such as 1, 2 or 4 radio frames. Alternatively, the time can be dynamically indicated, e.g. by using the lifetime parameter already mentioned before as being (optionally) part of the DCI payload or being encoded into the invalid parameter (see above). Assuming that the mobile station receives the DCI/CRC transmission in radio frame n, it then correspondingly processes the DCI and CRC, and applies the indicated TDD configuration for a particular number of radio frames n+1, n+2, n+3 etc, depending on the lifetime parameter in the DCI or the pre-defined fixed amount of time. After the dynamically indicated TDD configuration "expires", i.e. shall no longer be applied, the mobile station switches back to the default TDD configuration until for example it receives another TDD DCI for dynamic TDD UL/DL re-configuration.

Alternatively, the mobile station can also proceed to apply the new TDD configuration until it receives another TDD re-configuration; in other words, the new TDD configuration is not specified for a particular amount of time but indefinitely until instructed otherwise.

One improved variant of the third embodiment refers to the CRC of the DCI being scrambled by the base station with a system information RNTI (SI-RNTI), and furthermore the TDD configuration DCI being transmitted in an SI reception window which normally should not have been used by the base station to send system information. This will be explained in detail below.

In the prior art, the time domain scheduling of the MIB and SIB1 messages is fixed with periodicities of 40 ms and 80 ms respectively. Each SI message is transmitted in a defined periodically-occurring time domain window, while physical layer control signaling indicates in which subframes within this window the SI is actually scheduled. The scheduling windows of the different SI messages (referred to as SI-windows or SI reception windows) are consecutive (i.e. there are neither overlaps nor gaps between them) and have a common length that is configurable. SI-windows can include subframes in which it is not possible to transmit SI messages, such as subframes used for SIB1, and subframes used for the uplink in TDD.

SI messages may have different periodicities. Consequently, in some clusters of SI-windows all the SI messages are scheduled while in other clusters only the SI messages with shorter repetition periods are transmitted. For one example, the cluster of SI-windows beginning at System Frame Number (SFN) 0 contains all the SI messages, and the cluster starting at another SFN may contain only the first SI message, depending on the periodicities previously defined. For a more detailed discussion on SI-windows, please refer to the technical standard or to LTE—The UMTS Long Term Evolution—From Theory to Practice, Edited by Stefanie Sesia, Issam Toufik, Matthew Baker, Chapters 3.2.2 and 3.2.2.1, incorporated herein by reference.

As a result, depending on the particular periodicities (especially for long repetition periods/cycles), there will be SI-windows in which no SI is transmitted, and thus these SI-windows will not be used by base station to transmit system information. This can be taken advantage of.

In one variant of the third embodiment, the DCI, which CRC is scrambled with the SI-RNTI, is transmitted by the base station in one of said unused SI-windows. The mobile station knows in advance that this particular SI-window will not be used to transmit system information, since the mobile station is also aware of the periodicities of the SI-messages. Thus, when the mobile station receives a SI-message (i.e. the TDD DCI, which CRC is scrambled with the SI-RNTI), the mobile station knows that this can not be a conventional SI-message. Correspondingly, it is aware that this SI-message, received within an SI-window which normally should not have been used by the base station to transmit an SI-message, must be a TDD configuration message. Furthermore, the mobile station can corroborate this by determining whether the DCI payload includes an invalid parameter.

In order to relieve the mobile station of the burden of detecting possible SI-messages in SI-windows which normally would not be used by the base station for transmitting SI-messages, a further variant of the third embodiment defines a "TDD-DCI reception window". The TDD-DCI reception window is to be understood as restricting where the mobile station should expect TDD-DCI message to just particular subframes and/or radio frames. In other words, preferably a periodic pattern of—possibly but not necessarily adjacent—subframes and/or radio frames is defined as the TDD-DCI reception window (or equivalently pattern), where the TDD-DCI message can be transmitted by the base station, and/or only needs to be received and detected by the mobile station.

Such a window can be used in general with any of the described embodiments and independently of the used SI-RNTI. For exemplary purposes, the following describes the situation where the TDD-DCI reception window is used and the SI-RNTI is used to scramble the CRC of the DCI. As mentioned above, the UE can know that the detected DCI is a TDD DCI if the DCI is detected in an SI window that is unused for SI-message transmissions as a function of the configured SI periodicities. Such unused SI windows may therefore be more or less frequently occurring. It can therefore be beneficial—in order to create more possibilities of transmitting a TDD DCI—to define a TDD-DCI reception window. In case a subframe is part of a used SI-window as well as part of the TDD-DCI reception window, preferably the mobile station associates a successfully detected DCI with the CRC scrambled by the SI-RNTI as being a TDD-DCI and not used for the purposes of indicating an SI transmission. Alternatively, in such a situation the mobile station interprets such a DCI as a TDD-DCI if an invalid parameter within the DCI is detected, and as a DCI for indicating an SI transmission otherwise.

According to a variant of the third embodiment, the CRC of the DCI is scrambled by a SI-RNTI. In case this is detected by the mobile station in an unused SI-window and/or in a subframe designated as part of a TDD-DCI reception window, the mobile station is aware that the DCI is intended for a TDD configuration message. In this variant, the DCI assigns physical resources for transmission of a transport block, in a similar fashion as e.g. currently DCI format 1A can be used to assign physical resources for a transport block. Said transport block can then represent a MAC or RRC message, which contains information and parameters about the TDD (re-)configuration as e.g. the TDD configuration index or further parameters outlined in the later sections of the present application. Therefore, instead of (or in addition to) the TDD indication within the DCI message, the transport block indicated by the DCI message contains the TDD indication.

Further Parameters

The above described first, second and third embodiments mention that further parameters may be included in the downlink control information used for the dynamic TDD UL/DL re-configuration, either as separate parameters of the DCI or encoded into the invalid parameter. These parameters were only briefly discussed and will be explained in more detail below.

Target Cell Identifier

As already apparent from the term, this identifier shall identify the particular cell for which the TDD UL/DL configuration, transmitted with the DCI/CRC, shall apply. However, this parameter should be the one used in the DCI, and may be different from the one used for scrambling the CRC of the DCI, as explained for the second embodiment. For instance, while the SC-RNTI used for scrambling is 16 bit, the target cell identifier to be included into the DCI payload can any suitable size.

There may be scenarios in which one cell transmits the dynamic TDD UL/DL re-configuration message, although the TDD UL/DL re-configuration shall be applied in another cell. This may be the case for the above mentioned enhanced local area (eLA) scenario. Particularly, when the TDD configuration is intended for an SCell, then preferably the dynamic TDD re-configuration may be transmitted in the PCell.

Depending on the number of different cells in the system, only a few bits are necessary for the target cell identifier to distinguish between the various cells.

The target cell identifier can be implemented in different ways. For example, the physical cell identity (PCID, in TS 36.211; PhysCellId in TS 36.331) defined by 3GPP Release 8 can be used, the PCID directly pointing to an index. Alternatively, the numbering currently used for SCell addition and modification (parameters SCellIndex, sCellToAddModList, SCellToAddMod-r10, see e.g. TS 36.331, section 5.3.10.3b and other sections therein) can be directly used, or a new relation between target cell identifier and target cell can be established.

Another way of implementing the target cell identifier refers to the use of a 3-bit carrier indicator field (CIF). The CIF field is usually intended for cross-carrier scheduling, and identifies the carrier for which the scheduling refers. The CIF thus can identify another carrier, and thus allows the mobile station to determine for which cell (carrier) the TDD configuration received with the DCI is to be applied. This preferably reuses the numbering and relations similar to the procedure of SCell addition and modification (TS 36.331, section 5.3.10.3b and parameters SCellIndex, sCellToAddModList, SCellToAddMod-r10, described in other sections therein)

Still another option for the target cell identifier is similar to the Cooperative Multipoint (CoMP) method of 3GPP Release 10. Instead of pointing to a physical cell identifier, the target cell identifier is pointing to one or more reference symbol resources or configurations such as CRS port or CSI-RS resource, resource as specified in TS 36.211, section 6.10.1 and 6.10.5, and as specified in information element CSI-RS-Config in TS 36.311.

Still another option for the target cell identifier is to establish a new relation between target cell identifier and target cell.

Correspondingly, the mobile station determines the target cell from this target cell identifier included in the DCI.

Lifetime Parameter

As explained in the background section, compared to other TDD re-configuration methods based e.g. on MAC or RRC, the TDD re-configuration by DCI/CRC of the present invention shall be in the order of 10 ms. Of course, the dynamic TDD re-configuration indication could be valid for only one radio frame; however, this would require a large overhead, since the same TDD re-configuration message would need to be transmitted every 10 ms.

According to a different solution, the DCI could include a lifetime parameter indicating the amount of time the TDD re-configuration should be valid. The lifetime parameter may be implemented in various ways, and can have a length of various bits.

Using a lifetime parameter of only 1 bit, allows distinguishing between two periods for which the TDD configuration shall be valid; e.g. 10 ms and 40 ms, i.e. 1 radio frame and 4 radio frames. One radio frame appears to be the shortest reasonable valid time for such a dynamic TDD UL/DL re-configuration. 4 radio frames is equivalent to an MBSFN (Multicast-Broadcast Single Frequency Network) interval. Of course, any other time values than 10 and 40 ms may be defined, such as 100 ms or 200 ms. 200 ms, i.e. 20 radio frames, is equivalent to the RRC time scale for TDD re-configuration. Thus, the gap between the TT re-configuration time scales using the PHY-layer (i.e. DCI/CRC) and the MAC/RRC layer can be closed without losing potential to quickly reconfigure.

Using more than 1 bit, i.e. 2 bits or more, for the lifetime parameter naturally allows a more flexible TDD re-configuration.

Thus, the mobile station determines the amount of time the dynamic TDD configuration, indicated by said DCI/CRC, shall be applied.

HARQ Instruction

The HARQ instruction, for instructing the mobile station(s) to reset or not the HARQ protocol upon applying the new TDD configuration, relates to the problem caused by the change of TDD configuration, as will be explained in connection with FIG. 14.

Figure 14:
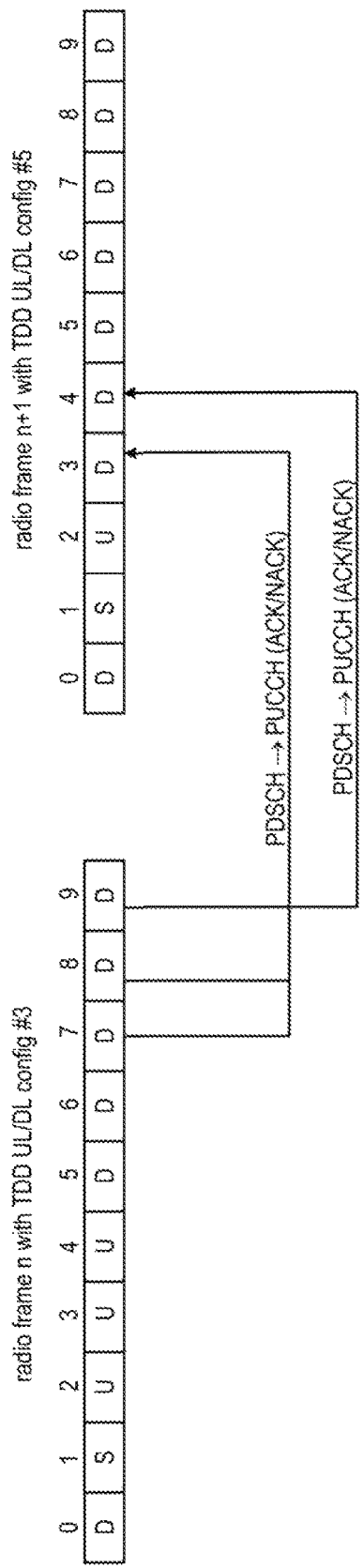
FIG. 14 shows two radio frames with different TDD UL/DL configurations, together with some timing relations for data and feedback transmissions.

For illustration purposes it is assumed in FIG. 14 that a TDD UL/DL configuration #3 is applied to radio frame n, and a TDD UL/DL configuration #5 is applied to the next radio frame n+1. As depicted, subframes 3, 4 change from uplink to downlink. Correspondingly, the number of HARQ processes or the timing relation for UL HARQ can change, when reconfiguring the TDD UL/DL subframes, as can be seen in TS 36.213 section 7 (with Table 7-1), section 8, section 8.3 (with Table 8.3-1), and section 10 including subsections, particularly subsection 10.2. In case there are fewer HARQ processes, the UE cannot know which process is continued and which earlier PDCCH is the reference for the NDI (New Data Indicator) toggling. Some of the resulting problems will be discussed in more detail below.

The HARQ procedure for PDSCH received in subframes 7, 8 and 9 of radio frame n is showing ambiguities. The ACK/NACK feedback for the assumed PDSCH transmission in those subframes 7, 8 and 9 can no longer be performed correctly, since the subframes 3 and 4 of radio frame n+1 do no longer allow sending the PUCCH with the ACK/NACK feedback.

The HARQ parameter can configure the HARQ behavior in the mobile station upon applying a TDD UL/DL re-configuration.

A first option is that the HARQ instruction instructs a complete reset of the HARQ protocol, such that all subsequent transmissions are triggering a new transport block. Implicitly, the HARQ buffers are flushed, i.e. deleted. The advantage is that the corruption of the HARQ buffers can be avoided.

This first option can be specified by the following procedure. The NDIs for all uplink HARQ processes are set to the value 0. The soft buffers for all downlink HARQ processes are flushed. For each downlink HARQ process, the next received transmission for a transport block is considered as the very first transmission.

The second option for the HARQ instruction parameter is that the HARQ protocol is no reset. Thus, the HARQ buffers are kept to enable continuation of the HARQ protocol across TDD UL/DL reconfiguration so as to optimize throughout performance. This if beneficial, if most HARQ processes according to the old TDD configuration have completed successfully at the time of the TDD re-configuration.

Therefore, there is a trade-off between the first and second option, and the base station may set the HARQ instruction to one of the two. A HARQ instruction field of 1-bit suffices in this preferable case.

Therefore, the mobile station determines how to behave regarding the HARQ processes, from this parameter.

Padding Field

The padding field may be inserted into the DCI with a pre-defined value known to the mobile station as well as the base station and in order that the mobile station may determine whether the padding field takes the value as pre-defined. If the DCI comprises the padding field with the pre-determined value, the mobile station may determine that the received DCI indeed transports the TDD UL/DL re-configuration. Therefore, the padding field allows the mobile station a second time to determine that the DCI transports the TDD UL/DL configuration; not only by the TDD RNTI (first embodiment), the SC-RNTI (second embodiment), or the invalid parameter in the DCI (third embodiment).

The padding field is included preferably in a DCI of a 3GPP Format, such as the Format 1C, in order to exploit the remaining bits of the DCI, that may not be used for any of the other parameters. The padding field can thus have a length of 1-32 bits. When using a DCI of a particular size, and after deciding and setting the particular additional parameters to be included in the DCI, often there will be bits remaining that would not be otherwise used. Therefore, to exploit these bits as well, padding field is used.

The term "virtual CRC" may also be used by the skilled person to describe such a padding field with determined bit values.

Thus, the mobile station can compare the value of the padding field with the pre-defined value to ensure that the DCI carrying said padding field indeed is intended for carrying the dynamic TDD re-configuration.

Buffer Status Report (BSR)

BSRs from the mobile station to the base station are used to assist the allocation of uplink resources. Generally, the more buffer is filled at the mobile station, the more resources or more frequently resources should be assigned to that mobile station for uplink transmission. Details can be found in LTE—The UMTS Long Term Evolution—From Theory to Practice, Edited by Stefanie Sesia, Issam Toufik, Matthew Baker, Chapter 4.4.2.2.

The reporting of BSRs is a MAC function, which implies that the corresponding transport blocks on the physical layer are subject to the HARQ procedure with possible retransmissions. A BSR can be triggered under several circumstances, amongst which is the expiry of a 'periodicBSR' timer. Details can be found in LTE—The UMTS Long Term Evolution—From Theory to Practice, Edited by Stefanie Sesia, Issam Toufik, Matthew Baker, Chapter 4.4.2.2, incorporated herein by reference.

As mentioned, upon applying a TDD reconfiguration there could be some unclarity or confusion between mobile station and base station as to the status of the HARQ protocol. In the case of transmission of BSR, there could be therefore a misunderstanding if a BSR is part of an uplink (re)transmission after a TDD reconfiguration. Therefore, the mobile station may receive a parameter to let it know whether the BSR procedure should be reset, which may imply one or more of the following:

cancel or restart pending (re)transmissions of BSR
reset/restart the 'periodicBSR' timer
reset/restart the 'retxBSR' timer Scheduling Request (SR) and Random Access Channel (RACH) Procedure In case the mobile station intends to transmit a BSR but no or not sufficient uplink resources are available to transmit the BSR, the mobile station can transmit an SR to the base station on PUCCH or by using the RACH procedure. Details can be found in LTE—The UMTS Long Term Evolution—From Theory to Practice, Edited by Stefanie Sesia, Issam Toufik, Matthew Baker, Chapter 4.4.2.2, incorporated herein by reference. Since the timing when a PUCCH might be transmitted for a received PDSCH transmission is generally affected by a TDD reconfiguration as shown in FIG. 14, and the RACH procedure may extend beyond a radio frame, i.e. be affected by a TDD reconfiguration due to a change of the location and amount of available DL and UL transmission opportunities to complete the whole RACH procedure, it can be safer against errors to tell the mobile station that it should cancel or restart the SR and/or the RACH procedure anew after applying the new TDD configuration.

Power Headroom Reporting (PHR)

Similar to BSR, the PHR is used to manage the uplink transmission power of the mobile station. The base station can use the PHR to determine how much more uplink bandwidth per subframe a mobile station is capable of using. Details can be found in LTE—The UMTS Long Term Evolution—From Theory to Practice, Edited by Stefanie Sesia, Issam Toufik, Matthew Baker, Chapter 18.3.3, incorporated herein by reference.

Since the available uplink transmission power per subframe needs to be distributed across the assigned uplink bandwidth, this is equivalent to a power headroom report. A PHR is triggered e.g. when a significant change in the estimated path loss since the last PHR is detected, or when a configured time since the previous PHR has expired ('PHR prohibit timer'), or when more than a configured number of TPC commands has been implemented by the mobile station.

Similar to the BSR, the PHR is transmitted as a MAC information in assigned uplink resources, and therefore the procedure can be affected by a TDD reconfiguration. Therefore an additional parameter can tell the mobile station that upon TDD reconfiguration it should do one or more of the following:
cancel a pending PHR report
trigger a new PHR report
reset/restart the PHR Prohibit Timer
reset the TPC command counter or set it to a defined value Hardware and Software Implementation of the Invention Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for indicating one of a plurality of Time Division Duplex (TDD) configurations to a mobile station in a communication system, the TDD configuration defining uplink, downlink and special subframes within one or more radio frames, each radio frame including multiple subframes, wherein the method comprises the following steps performed by the mobile station:
receiving, from a base station of a first cell, downlink control information and a corresponding error detection code for the downlink control information, wherein the downlink control information indicates a TDD configuration and the error detection code is scrambled by the base station with an identifier associated with the mobile station,
determining the identifier used to scramble the error detection code,
in response to successfully determining the identifier, determining the TDD configuration from the downlink control information,
determining at least one target cell, to which to apply the determined TDD configuration,
applying the determined TDD configuration to a radio frame n+1 in the at least one target cell, wherein n corresponds to a radio frame in which the downlink control information and the error detection code are received by the mobile station, and
in response to expiration of the determined TDD configuration, applying a default TDD configuration to a radio frame n+1+x when the mobile station is configured with the default TDD configuration, wherein x is a positive integer.

2. The method according to claim 1, wherein the first cell is operated with frequency division duplex, and the at least one target cell is operated with TDD.

3. The method according to claim 1, wherein the identifier is used to determine either a single target cell, or a group of target cells out of all cells.

4. The method according to claim 1, wherein the communication system is an LTE communication system, and the downlink control information is a downlink control information of format 1C.

5. The method according to claim 1, wherein the downlink control information comprises an invalid parameter with one out of a plurality of invalid values, wherein all of the plurality of invalid values indicate that the downlink control information indicates one of a plurality of TDD configurations, and wherein each or a group of the invalid values of the invalid parameter indicates at least one of the following:

the TDD configuration,
a HARQ instruction to reset or to not reset, upon applying the indicated TDD configuration, a HARQ protocol of the mobile station for the target cell to which the TDD configuration is applied,
a lifetime parameter for the indicated TDD configuration, such that the mobile station determines an amount of time for which the indicated TDD configuration shall be applied from the lifetime parameter,
a buffer status report procedure instruction, instructing to cancel a pending buffer status report procedure or to trigger a new buffer status report procedure, upon applying the indicated TDD configuration,
a scheduling request procedure instruction, instructing to cancel a pending scheduling request procedure or to trigger a new scheduling request procedure, upon applying the indicated TDD configuration,
a random access channel procedure instruction, instructing to cancel a pending random access channel procedure or to trigger a new random access channel procedure, upon applying the indicated TDD configuration,
a power headroom reporting instruction, instructing to cancel a pending power headroom reporting or to trigger a new power headroom reporting, upon applying the indicated TDD configuration.

6. The method according to claim 1, wherein the downlink control information comprises at least one of the following:
a TDD configuration field, indicating the TDD configuration,
a HARQ instruction, including an instruction to reset or to not reset, upon applying the indicated TDD configuration, a HARQ protocol of the mobile station for the target cell to which the TDD configuration is applied,
a lifetime parameter for the indicated TDD configuration, such that the mobile station determines an amount of time for which the indicated TDD configuration shall be applied from the lifetime parameter,
a padding field with a bit value, such that the mobile station determines whether the bit value of the padding field is identical to a pre-defined bit value,
a buffer status report procedure instruction, instructing to cancel a pending buffer status report procedure or to trigger a new buffer status report procedure, upon applying the indicated TDD configuration,
a scheduling request procedure instruction, instructing to cancel a pending scheduling request procedure or to trigger a new scheduling request procedure, upon applying the indicated TDD configuration,
a random access channel procedure instruction, instructing to cancel a pending random access channel procedure or to trigger a new random access channel procedure, upon applying the indicated TDD configuration,
a power headroom reporting instruction, instructing to cancel a pending power headroom reporting or to trigger a new power headroom reporting, upon applying the indicated TDD configuration.

7. The method according to claim 1, wherein x is 1, 2 or 4.

8. A mobile station for processing one of a plurality of Time Division Duplex (TDD) configurations in a communication system, the TDD configuration defining uplink, downlink and special subframes within one or more radio frames, each radio frame including multiple subframes, wherein the mobile station comprises:
a receiver which, in operation, receives downlink control information and a corresponding error detection code for the downlink control information, wherein the error detection code is scrambled by the base station with an identifier associated with the mobile station,
a processor which, in operation:
determines the identifier used to scramble the error detection code,
in response to successfully determining the identifier, determines the TDD configuration from the downlink control information,
determines at least one target cell, to which to apply the determined TDD configuration,
applies the determined TDD configuration to a radio frame n+1 in the at least one target cell, wherein n corresponds to a radio frame in which the downlink control information and the error detection code are received by the mobile station, and
in response to expiration of the determined TDD configuration, applies a default TDD configuration to a radio frame n+1+x when the mobile station is configured with the default TDD configuration, where x is a positive integer.

9. The mobile station according to claim 8, wherein the communication system is an LTE communication system, and the downlink control information is a downlink control information of format 1C.

10. The mobile station according to claim 8, wherein the downlink control information comprises an invalid parameter with one out of a plurality of invalid values, and the processor is adapted to determine that the downlink control information indicates one of a plurality of TDD configurations based on any of the invalid values, and the processor is adapted to determine, based on the particular invalid value of the invalid parameter of the downlink control information, at least one of the following:
the TDD configuration,
a HARQ instruction to reset or to not reset, upon applying the indicated TDD configuration, a HARQ protocol of the mobile station for the target cell to which the TDD configuration is applied,
a lifetime parameter indicating an amount of time for which the indicated TDD configuration shall be applied from the lifetime parameter,
a buffer status report procedure instruction, instructing to cancel a pending buffer status report procedure or to trigger a new buffer status report procedure, upon applying the indicated TDD configuration,
a scheduling request procedure instruction, instructing to cancel a pending scheduling request procedure or to trigger a new scheduling request procedure, upon applying the indicated TDD configuration,
a random access channel procedure instruction, instructing to cancel a pending random access channel procedure or to trigger a new random access channel procedure, upon applying the indicated TDD configuration,
a power headroom reporting instruction, instructing to cancel a pending power headroom reporting or to trigger a new power headroom reporting, upon applying the indicated TDD configuration.

11. The mobile station according to claim 8, wherein the processor is adapted to determine from the downlink control information at least one of the following:
the TDD configuration from a TDD configuration field,
a HARQ instruction, including an instruction to reset or to not reset, upon applying the indicated TDD configuration, a HARQ protocol of the mobile station for the target cell to which the TDD configuration is applied, a lifetime parameter for the indicated TDD configuration, from which the processor is adapted to determine an amount of time for which the indicated TDD configuration shall be applied, a padding field bit value, such that the mobile station determines whether the bit value of the padding field is identical to a pre-defined bit value, a buffer status report procedure instruction, instructing to cancel a pending buffer status report procedure or to trigger a new buffer status report procedure, upon applying the indicated TDD configuration, a scheduling request procedure instruction, instructing to cancel a pending scheduling request procedure or to trigger a new scheduling request procedure, upon applying the indicated TDD configuration, a random access channel procedure instruction, instructing to cancel a pending random access channel procedure or to trigger a new random access channel procedure, upon applying the indicated TDD configuration, a power headroom reporting instruction, instructing to cancel a pending power headroom reporting or to trigger a new power headroom reporting, upon applying the indicated TDD configuration.

12. The mobile station according to claim 8, wherein x is 1, 2 or 4.

\* \* \* \* \*